(12) United States Patent
Harris et al.

(10) Patent No.: US 11,884,177 B2
(45) Date of Patent: Jan. 30, 2024

(54) ELECTRIC VEHICLE CHARGING SYSTEM AND METHOD

(71) Applicant: Atom Power, Inc., Huntersville, NC (US)

(72) Inventors: Michael J. Harris, Charlotte, NC (US); Ryan Kennedy, Cornelius, NC (US); Denis Kouroussis, Markham (CA)

(73) Assignee: Atom Power, Inc., Huntersville, NC (US)

(*) Notice: Subject to any disclaimer, the term of this patent is extended or adjusted under 35 U.S.C. 154(b) by 0 days.

(21) Appl. No.: 17/543,893

(22) Filed: Dec. 7, 2021

(65) Prior Publication Data

US 2022/0176840 A1 Jun. 9, 2022

Related U.S. Application Data

(60) Provisional application No. 63/122,681, filed on Dec. 8, 2020.

(51) Int. Cl.
*B60L 53/63* (2019.01)
*B60L 53/67* (2019.01)
(Continued)

(52) U.S. Cl.
CPC .............. *B60L 53/63* (2019.02); *B60L 53/67* (2019.02); *H02J 7/0029* (2013.01); *H02J 2207/20* (2020.01)

(58) Field of Classification Search
CPC ...... B60L 53/63; B60L 53/67; H02J 2207/20; H02J 7/0029; Y02T 10/70; Y02T 10/7072; Y02T 90/12; Y02T 90/14; Y02T 90/16
See application file for complete search history.

(56) References Cited

U.S. PATENT DOCUMENTS

| 4,316,256 A | 2/1982 | Hendricks et al. |
| 4,644,438 A | 2/1987 | Puccinelli et al. |
| (Continued) | | |

FOREIGN PATENT DOCUMENTS

| CN | 1375923 A | 10/2002 |
| CN | 1558248 A | 12/2004 |
| (Continued) | | |

OTHER PUBLICATIONS

P. Meckler, "Does and Electronic Circuit Breaker need Electrical Contacts?", Proceedings of the 50th IEEE Holm Conference on Electrical Contacts and The 22nd International Conference on Electrical Contacts, pp. 480-487, 2004.
(Continued)

*Primary Examiner* — Elim Ortiz
(74) *Attorney, Agent, or Firm* — Withrow & Terranova, P.L.L.C.

(57) ABSTRACT

An electric vehicle (EV) charging system includes a plurality of electrical vehicle supply equipment (EVSE) units, a plurality of associated EV charging stations, electrical power distribution wires or cables for distributing electrical power from the plurality of EVSE units to the plurality of EV charging stations, and an EVSE communications bus. Each EVSE unit includes a microcontroller unit (MCU) and a solid-state switch that control whether electrical current is able to flow to an associated EV charging station and connected plug-in EV (PEV) load. The MCUs communicate over the EVSE communications bus and, as PEVs charge, plug into, and unplug from the plurality of EV charging stations, reallocate or reapportion an available supply current among the plurality of EVSE units while also dynamically adjusting one or more circuit protection attributes also provided by the EVSE units.

31 Claims, 12 Drawing Sheets

(51) Int. Cl.
*B60L 7/00* (2006.01)
*H02J 7/00* (2006.01)

(56) References Cited

U.S. PATENT DOCUMENTS

| | | | |
|---|---|---|---|
| D288,921 S | 3/1987 | Peck | |
| D305,019 S | 12/1989 | Pena et al. | |
| 5,132,865 A | 7/1992 | Mertz et al. | |
| D331,063 S | 11/1992 | Pasierb | |
| D334,542 S | 4/1993 | Lowe et al. | |
| D351,861 S | 10/1994 | Anderson et al. | |
| 5,502,286 A | 3/1996 | Pollman et al. | |
| 5,638,038 A | 6/1997 | Suzuki et al. | |
| D393,808 S | 4/1998 | Lindsey et al. | |
| 5,782,341 A | 7/1998 | Calder et al. | |
| 6,008,971 A | 12/1999 | Duba et al. | |
| D435,021 S | 12/2000 | Davis et al. | |
| D443,586 S | 6/2001 | Sakasegawa | |
| D443,595 S | 6/2001 | Pawley | |
| 8,582,265 B2 | 11/2013 | Britz | |
| D695,234 S | 12/2013 | Santiago et al. | |
| D697,033 S | 1/2014 | Hashimoto et al. | |
| 8,861,162 B2 | 10/2014 | Fuller et al. | |
| 9,287,065 B1 | 3/2016 | Davis et al. | |
| D754,615 S | 4/2016 | Chen et al. | |
| D768,582 S | 10/2016 | Jacoby et al. | |
| D784,168 S | 4/2017 | Jacoby et al. | |
| 10,134,551 B2 | 11/2018 | Potter et al. | |
| 10,276,321 B2 | 4/2019 | Kennedy et al. | |
| 10,541,530 B2 | 1/2020 | Kennedy et al. | |
| 10,630,069 B2 | 4/2020 | Kennedy et al. | |
| 10,784,061 B2 | 9/2020 | Kennedy et al. | |
| 10,804,692 B2 | 10/2020 | Kennedy et al. | |
| 10,811,867 B2 | 10/2020 | Kennedy et al. | |
| 10,896,790 B2 | 1/2021 | Kennedy et al. | |
| 10,896,791 B2 | 1/2021 | Kennedy et al. | |
| 11,037,749 B2 | 6/2021 | Kouroussis et al. | |
| 2001/0026185 A1 | 10/2001 | Sher | |
| 2002/0093774 A1 | 7/2002 | Chung | |
| 2007/0121257 A1 | 5/2007 | Maitra et al. | |
| 2009/0290275 A1 | 11/2009 | Staszesky et al. | |
| 2010/0232082 A1 | 9/2010 | Seger | |
| 2011/0026185 A1 | 2/2011 | Boudet et al. | |
| 2011/0080677 A1 | 4/2011 | Radosavljevic et al. | |
| 2011/0102052 A1 | 5/2011 | Billingsley et al. | |
| 2011/0169447 A1* | 7/2011 | Brown | B60L 53/65 320/109 |
| 2011/0202418 A1 | 8/2011 | Kempton et al. | |
| 2011/0222200 A1 | 9/2011 | Fuller et al. | |
| 2011/0292556 A1 | 12/2011 | Britz | |
| 2011/0320056 A1 | 12/2011 | Brown et al. | |
| 2012/0218676 A1 | 8/2012 | Demetriades et al. | |
| 2013/0027829 A1 | 1/2013 | Antoniazzi et al. | |
| 2013/0169038 A1* | 7/2013 | King | H02J 7/0031 307/66 |
| 2013/0310999 A1 | 11/2013 | Baxter et al. | |
| 2014/0029153 A1 | 1/2014 | Besana et al. | |
| 2014/0077761 A1* | 3/2014 | Hamrin | B60L 3/12 320/109 |
| 2014/0139182 A1 | 5/2014 | Ichikawa et al. | |
| 2014/0268464 A1* | 9/2014 | Dai | H02M 1/32 361/91.1 |
| 2015/0084420 A1 | 3/2015 | Dickerson et al. | |
| 2015/0165917 A1* | 6/2015 | Robers | B60L 53/68 320/109 |
| 2015/0210232 A1* | 7/2015 | Kanzaki | H02H 7/18 701/36 |
| 2015/0236502 A1 | 8/2015 | Xu et al. | |
| 2015/0348722 A1 | 12/2015 | Fraser et al. | |
| 2016/0197465 A1 | 7/2016 | Poulose et al. | |
| 2016/0243951 A1 | 8/2016 | Pritelli et al. | |
| 2017/0004948 A1 | 1/2017 | Leyh | |
| 2017/0069441 A1 | 3/2017 | Mishrikey et al. | |
| 2018/0254643 A1 | 9/2018 | Paluszek et al. | |
| 2020/0266633 A1 | 8/2020 | Baumann et al. | |
| 2020/0052507 A1 | 12/2020 | Apeldoorn et al. | |
| 2020/0395748 A1 | 12/2020 | Frederick et al. | |
| 2021/0066013 A1 | 3/2021 | Kumar et al. | |
| 2022/0006250 A1* | 1/2022 | Deore | H02G 5/08 |
| 2022/0060102 A1* | 2/2022 | Mazumder | H02M 1/32 |
| 2022/0321016 A1* | 10/2022 | Khaligh | H02M 3/01 |

FOREIGN PATENT DOCUMENTS

| | | |
|---|---|---|
| EP | 3041101 | 7/2016 |
| JP | 3336027 B2 * | 10/2002 |

OTHER PUBLICATIONS

UNCC, "Senior Design Team Works with Atom Power to Design Revolutionary Circuit Breaker," dated Jan. 29, 2016, [online], [site visited Aug. 1, 2017], Available from Internet <URL: https://isl.uncc.edu/news/2016-01-29/senior-design-team-works-atom-power-design-revolutionary-circuit-breaker>.

Eaton ,"Eaton's New Narrow Frame Power And Air Circuit Breaker Offers Reduced Size And Improved Safety," dated Jun. 23, 2009, [online], [site visited Mar. 4, 2018]. Available from Internet, <URL: https://www.eaton.com/Eaton/OurCompany/NewsEvents/NewsReleases/CT_238199>.

Signaworks, "Dual On/Off Push Button," dated Apr. 26, 2014, [online], [site visited Aug. 1, 2017]. Available from Internet, <URL: http://www.signaworks.com/products/industrial-push-buttons/dual-on/off-push-button.html>.

Eblogbd, "Function and rated characteristics of circuit breaker—all things need to know of circuit breaker," dated Oct. 20, 2013, [online], [site visited Mar. 4, 2018]. Available from Internet, <URL: http://eblogbd.com/details-characteristics-circuit-breaker/>.

J. Kiedaisch, "How the World's First Digital Circuit Breaker Could Completely Change the Powered World," Popular Mechanics, May 22, 2019. Available from Internet: <URL: https://www.popularmechanics.com/technology/infrastructure/a27557804/digital-circuit-breaker/>.

International Search Report (ISR) and Written Opinion (WO) from PCT/US2021/062118, dated Feb. 23, 2022.

* cited by examiner

| Total Current Available at EVSEP | 50A | |
| --- | --- | --- |
| | | |
| | Vehicle A | |
| Total Current Allocation (A) | 50 | |
| Solid State Circuit Breaker (A) | 62.5 | |
| | | |
| | Vehicle A | Vehicle B |
| Time on charge (min) | 30 | 50 |
| Time to charge complete (min) | 200 | 500 |
| Percent of charge (Calculated) | 0.15 | 0.1 |
| Ratio of charge to be completed (Calculated) | 0.4 | 0.6 |
| | | |
| Vehicle Current Allocation (A) (Calculated) | 20 | 30 |
| Solid State Circuit Breaker (A) | 25 | 37.5 |

FIGURE 9

| Total Current Available at EVSEP | 50A | |
| --- | --- | --- |
| | | |
| | Vehicle A | Vehicle B |
| Time on charge (min) | 30 | 50 |
| Time to charge complete (min) | 200 | 500 |
| Percent of charge (Calculated) | 0.15 | 0.1 |
| Ratio of charge to be completed (Calculated) | 0.4 | 0.6 |
| | | |
| Rate (cents/kwhr) | 3 | 9 |
| Ratio of rate | 0.25 | 0.75 |
| | | |
| Weighting Factor Charge State | 0.6 | |
| Weighting Factor Rate | 0.4 | |
| | | |
| Vehicle Current Allocation from ratio of charge weighting factor (A) | 12 | 18 |
| Vehicle Current Allocation from rate weighting factor (A) | 5 | 15 |
| Total Vehicle Current Allocation (A) (Calculated) | 17 | 33 |

FIGURE 10

ELECTRIC VEHICLE CHARGING SYSTEM AND METHOD

CROSS-REFERENCE TO RELATED APPLICATIONS

This application claims the benefit of U.S. Provisional Patent Application No. 63/122,681, filed Dec. 8, 2020.

BACKGROUND OF THE INVENTION

Electric vehicle (EV) charging systems are becoming increasingly prevalent in modern society as the transition away from fossil-fuel-powered vehicles toward plug-in electric vehicles (PEVs) continues. Despite many advancements in PEV design in recent years, electric vehicle supply equipment (EVSE) in state-of-the-art EV charging systems remains relatively primitive. To compensate for the limited capabilities, modern EV charging systems tend to be built as "one-size-fits-all" systems. Unfortunately, this one-size-fits-all approach is expensive to implement since it requires the use of oversized electrical power distribution equipment (e.g., heavy gauge cables and wires) in order to accommodate most every conceivable PEV charging need. State-of-the art EVSE also fails to address several safety concerns that are potentially hazardous to EV charging system users. The present invention addresses these problems, providing an EV charging system that is not only safer to use and operate but that also maximizes infrastructure usage and avoids the high cost and need for oversized power distribution equipment.

BRIEF SUMMARY OF THE INVENTION

An electric vehicle (EV) charging system and method are disclosed. An exemplary embodiment of the disclosed EV charging system comprises a plurality of electrical vehicle supply equipment (EVSE) units, a plurality of associated EV charging stations, electrical power distribution wires or cables that distribute electrical power from the plurality of EVSE units to the plurality of EV charging stations, and an EVSE communications bus. Each of the EVSE unit includes a microcontroller unit (MCU) and a solid-state switch that control whether electrical current is able to flow to an associated EV charging station and connected plug-in EV (PEV) load. The MCUs in the plurality of EVSE units communicate over the EVSE communications bus to coordinate and allocate or apportion an available supply current among the plurality of EVSE units, and in a preferred embodiment further provide circuit protection for the associated EV charging stations and plug-in EVs (PEVs). As PEVs charge, plug into, and unplug from the plurality of EV charging stations, the EVSE units reallocate or reapportion the available supply current and dynamically adjust the circuit protections provided by the EVSE units, including, for example, the continuous current rating(s) of one or more EVSE units.

Further features and advantages of the invention, including a detailed description of the above-summarized and other exemplary embodiments of the invention, will now be described in detail with respect to the accompanying drawings, in which like reference numbers are used to indicate identical or functionally similar elements.

BRIEF DESCRIPTION OF THE DRAWINGS

FIG. 9 is a chart highlighting various charge control and circuit protection attributes involved in a weighting-based charge control and circuit protection method, according to one embodiment of the present invention;

FIG. 10 is a chart including various charge control and circuit protection attributes involved in a priority-dependent weighting-based charge control and circuit protection method, according to one embodiment of the present invention;

DETAILED DESCRIPTION

Figure 1:
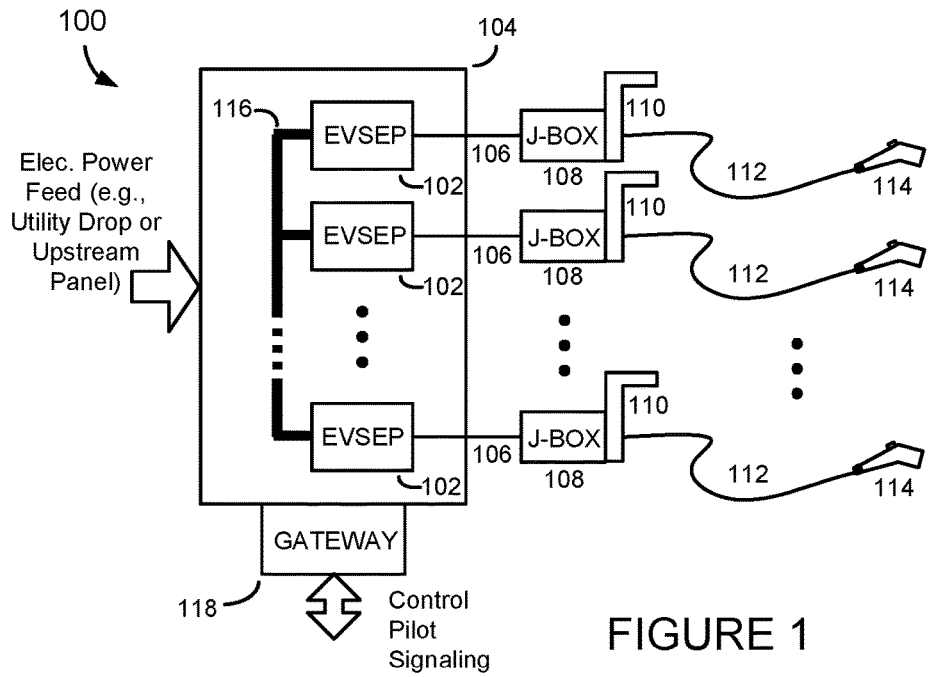
FIG. 1 is a block diagram of an electric vehicle (EV) charging system, according to an embodiment of the present invention.

Referring to FIG. 1, there is shown an electric vehicle (EV) charging system 100, according to one embodiment of the invention. The electric vehicle charging system 100 comprises a plurality of Electric Vehicle Supply Equipment units (also referred to as "EV supply equipment units" and "EVSEPs 102" in the detailed description that follows) electrically connected and configured within an EVSEP electrical distribution panel 104 (referred to as the "EVSEP panel 104" below). The electric vehicle charging system 100 further comprises electrical power distribution cables 106, junction boxes ("J-boxes") 108 located in the general vicinity of a plurality of associated charging stations 110, and plug-in charging cables 112. The electrical power distribution cables 106 distribute electrical power from the various EVSEPs 102 to the plurality of J-boxes 108 and associated charging stations 110, thereby providing a plurality of charging current sources for plug-in electric vehicles (PEVs) that connect to (i.e., "plug into") the charging station stations 110.

Each EVSEP 102 of the EV charging system 100 serves two primary purposes. First, each EVSEP 102 controls the maximum allowable charging current its associated charging station 110 is allowed to supply to a connected PEV at any given time. Second, each EVSEP 102 provides circuit protection to its associated charging station 110 and connected PEV, based on the maximum allowable charging current. The circuit protection and charge control functions provided by the EVSEPs 102 are self-operating, i.e., require no human interaction, and are both dynamically adjustable, individually and collectively, in other words, are adjusted in real time as PEVs connect to and from the charging stations 110. Prior art electric vehicle charging systems, in contrast, employ primitive vehicle supply equipment (EVSE) that lack these capabilities. Consequently, if an EV charging system facility provides, say, ten charging stations at 50 A each, the power distribution infrastructure for the facility must be constructed so that all charging stations are capable of supplying the full 50 A, all at the same time, even though all EVSEPs using the full 50 A all at the same time is unlikely or rarely to occur. In other words, the EV charging system facility must be constructed using oversized components, including heavy gauge wires and cables, and must include line-side power distribution infrastructure that is capable of, at any one time, sinking 500 A from the utility grid. Not only is the oversized infrastructure expensive to implement, it results in safety concerns, particularly in circumstances where consumers with PEVs having low-capacity battery packs, in need of relatively low charging currents, must connect to and charge from a high-current/high-voltage charging station. Conventional EVSE also does not typically provide any circuit protection to its charging stations and connected PEVs, relying instead entirely on the PEV's battery management system for circuit protection and/or on electromechanical circuit breakers located external to the EV charging system to provide the circuit protection. Any circuit protection that is provided is static, i.e., is not dynamically adjustable. The EV charging system 100 of the present invention avoids these problems, not only because the EVSEPs 102 have built-in circuit protection capabilities but also by virtue of the fact that the circuit protection and charge control functions provided by the EVSEPs 102 are dynamically adjustable, both individually and collectively. To emphasize these attributes and the various other advantages the EVSEPs 102 of the present invention have over conventional EVSEs, the letter "P" is appended to the acronym "EVSE" (i.e., EVSEP 02) in the description of the exemplary embodiments of the invention described herein—the "P" signifying the "Plus" capabilities the EVSEPs 102 have compared to conventional EVSEs, including the EVSEPs' dynamically adjustable circuit protection and dynamically adjustable charge control and charge allocation capabilities.

The EVSEP panel 104 is configured to receive electrical power from the utility grid (e.g., at a utility service drop) or, alternatively, from another upstream EVSEP panel or upstream conventional panel. In accordance with one embodiment of the invention, the EVSEP panel 104 further includes an EVSEP communications bus 116 (for example, a controller area network (CAN) bus or an inter-integrated circuit ($I^2C$) bus) and a gateway 118 that is communicatively coupled to the EVSEPs 102. The MCUs 202 (see FIG. 2) of the EVSEPs 102 are configured and programmed to communicate with one another over the EVSEP communications bus 116 and, among other things, assess, compute and, when necessary, apportion the total supply current supplied by EVSEP panel 104 among the various charging stations 110. The gateway 118 serves to distribute control pilot signals from the EVSEPs 102 to the handles 114 of the charging cables 112 located at the charging stations 110, e.g., via the J-boxes 108, and the control pilot signals are used to negotiate the charging currents supplied from the charging stations 110 to their connected PEVs, as will be described in more detail below.

Figure 2:
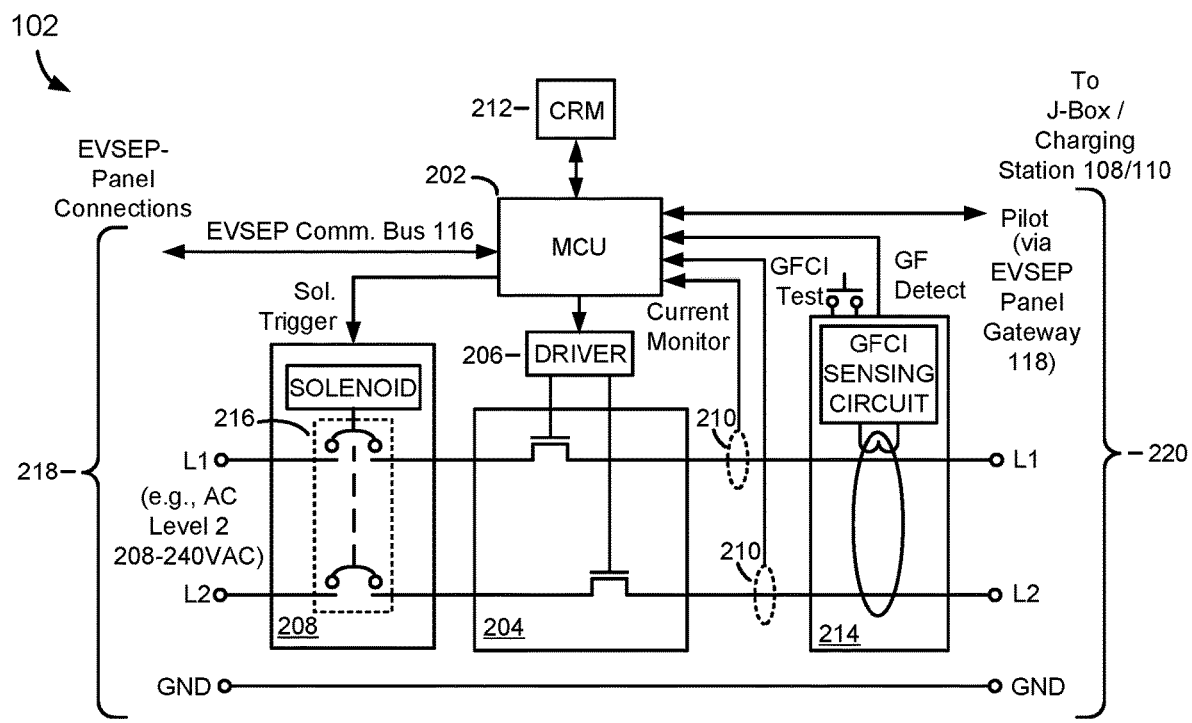
FIG. 2 is a drawing illustrating the salient components of an EV supply equipment unit (EVSE) or "EVSEP," according to an embodiment of the present invention.

FIG. 2 is a block diagram of one of the EVSEPs 102 employed in the EV charging system 100, highlighting its principal components. The principal components include: a microcontroller unit (MCU) 202; a bi-directional solid-state switch 204; a driver circuit 206, which controls whether the bi-directional solid-state switch 204 is ON (closed) or OFF (open); an air gap disconnect unit 208; Hall Effect sensors 210; computer readable memory (CRM) 212; and a ground-fault circuit interrupter (GFCI) 214. The bi-directional solid-state switch 204 comprises one or more power semiconductor devices connected in series with a closeable air gap 216 of the air-gap disconnect unit 208, between input (line-side) terminals 218 output (load-side) terminals 220. The input terminals 218 are electrically connected to hot busbar, neutral, and ground connections in the EVSEP panel 104, and the output terminals 220 are electrically connected to electrical power distribution cables or wires 106, which, as explained above, serve to distribute electrical power from each EVSEP 102 to its associated J-Box 108 and charging station 110. In a preferred embodiment of the invention the one or more bi-directional power semiconductor forming the bi-directional solid-state switch 204 comprise(s) one or more or more silicon carbide (SiC) metal-oxide-semiconductor field-effect transistors (MOSFETs). However, other types of power semiconductor devices can be used, as will be appreciated by those of ordinary skill in the art.

The CRM 212 in each of the EVSEPs 102 comprises flash memory and/or electrically-erasable programmable read-only memory (EEPROM) for storing the computer program instructions, and random-access memory (RAM), which the EVSEP's MCU 202 uses to perform the various operations specified by the computer program instructions. The CRM 212 may be entirely external to the MCU 202 (as depicted in FIG. 2), embedded entirely within the MCU 202, or may be partly external to the MCU 202 and partly integrated within the MCU 202, as will be appreciated and understood by those of ordinary skill in the art. Among other things, the computer program instructions include instructions that provide the MCU 202 in each EVSEP 102 the ability to set, control, and adjust the circuit protection settings of provided by the EVSEP 102 and instructions that provide the MCUs 202 the ability to set, control, and adjust how much charging current is allowed to flow through the EVSEP 102 to its associated charging station 110.

Under the control of its MCU 202 the bi-directional solid-state switch 204 in each EVSEP 102 determines whether charging current is allowed to flow to the EVSEP's associated charging station 110. As explained in further detail below, when the bi-directional solid-state switch 204 in a given EVSEP 102 is switched ON and the EVSEP's air-gap disconnect unit 208 is closed (in embodiments of the EVSEP that utilize an air-gap disconnect unit 208), charging current is able to flow through the solid-state switch 204 and closed air gap 216 of the air-gap disconnect unit 208, to the EVSEP's associated charging station 110, and ultimately to a PEV connected to (i.e., plugged into) the charging station 110, via associated J-box 108 and charging cable 112. However, upon the EVSEP's MCU 202 determining, with the aid of measurements taken by its Hall effect sensors 210, that a short circuit is present in the EVSEP's 102's load circuit, the MCU 202 directs the driver circuit 206 in the EVSEP 102 to switch the bi-directional solid-state switch 204 OFF, as soon as it is possible. It also generates a solenoid trigger signal that triggers a solenoid in the air-gap disconnect unit 208 to open the air gap 216 and thereby galvanically isolate the charging station 110 and PEV and prevent any additional current from flowing to the associated charging station 110. By employing solid-state switches 204 in the EVSEPs 102, the EVSEPs 102 are able to isolate short circuits over a thousand times faster than conventional electromechanical circuit breakers. There are various ways in which the air-gap disconnect unit 208 in the EVSEPs 102 can be designed to trigger and various ways in which EVSEPs' bi-directional solid-state switches 204 can be controlled to switch ON and OFF (e.g., entirely hardware controlled or hardware and software controlled). Some examples of how the EVSEPs 102 may be adapted to perform these functions can be found in commonly owned U.S. Pat. No. 10,541,530 and co-pending and commonly assigned U.S. patent application Ser. No. 16/898,538, both of which are incorporated herein by reference.

Figure 3:
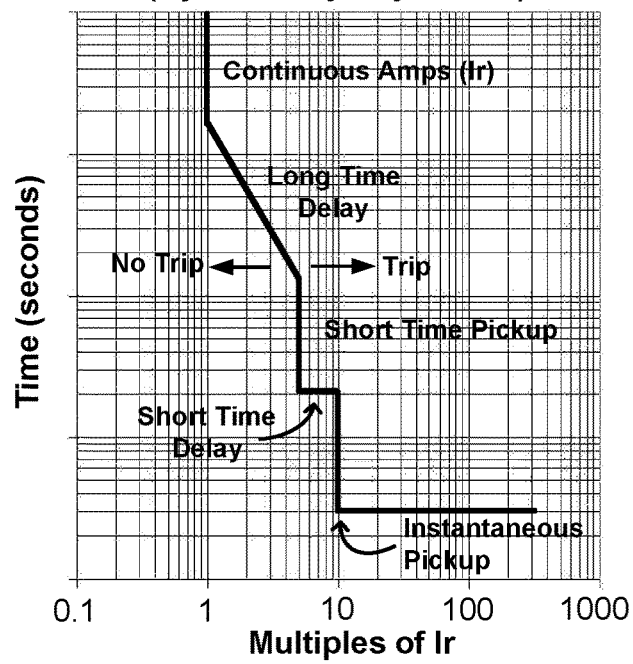
FIG. 3 is a drawing depicting an exemplary time-current characteristic (TCC) curve that an EVSEP can be configured and controlled to operate according to, including various dynamically adjustable circuit protection attributes.

In one embodiment of the invention the MCUs 202 and bi-directional solid-state switches 204 in the EVSEPs 102 not only provide short-circuit protection to the charging stations 100 and connected PEVs but the MCU 202 and bi-directional solid-state switch 204 in each EVSEP 102 also provides overcurrent protection and is configured and controlled by its associated MCU 202 to operate according to a dynamically adjustable time-current characteristic (TCC) curve, for example, as illustrated in FIG. 3. The computer program instructions (e.g., firmware) stored in the CRM 212 of each EVSEP 102 provides the MCU 202 the ability to set, control and adjust any one or more of the various circuit protection attributes of the TCC curves, including, but not limited to: the EVSEP's continuous current rating Ir, long-time delay and short-time delay trip settings, short time pickup current, and instantaneous pickup current. In a preferred embodiment of the invention the computer program instructions further include instructions that provide the MCU 202 in each EVSEP 102 the ability to communicate in real time with the MCUs 202 of other EVSEPs 102 in the EVSEP panel 104, over the EVSEP communications bus 116, and instructions that provide the MCU 202 in a given EVSEP 102 the ability to adjust the TCC curve of its respective bi-directional solid-state switch 204, dynamically and in real time, depending on the magnitudes of the currents that are currently allocated to other charging stations 110 and associated PEVs via other EVSEPs 102 in the EV charging system 100 (or depending on the magnitudes of the maximum allowable charging currents I_CHARGE currently set by the EVSEPs 102) and/or depending on changes (increases or decreases) in the magnitudes of the allocated currents (or depending on changes (increases or decreases) in the magnitudes of the maximum allowable charging currents I_CHARGE).

Figure 4:
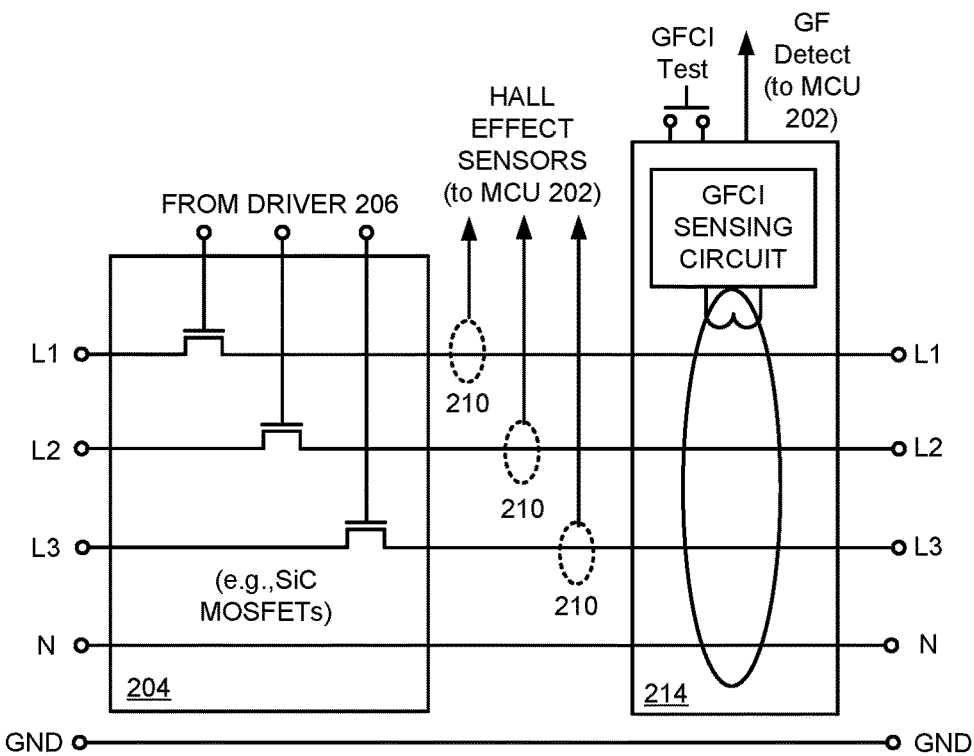
FIG. 4 is a drawing depicting the principal components of a three-phase embodiment of an EVSEP, according to an embodiment of the present invention.

The EVSEP 102 depicted in FIG. 2 can be easily modified to be a three-phase EVSEP, for use in a three-phase EV charging system. As illustrated in FIG. 4, the three-phase embodiment of the EVSEP 102 has three current carrying conductors (L1, L2, L3), instead of just two L1 and L2, and a three-phase bi-directional solid-state switch. Although not shown in the drawing, the three-phase embodiment of the EVSEP also includes, preferably though not necessarily, a modified air gap disconnect unit with a closeable air gap in all three lines L1, L2 and L3.

It should be mentioned that whereas the exemplary embodiment of the EVSEP 102 described herein and depicted in FIG. 2 and other drawings of this disclosure includes air gap disconnect unit 208, in other embodiments of the invention the EVSEP 102 does not include an air gap disconnect unit but rather relies solely on the bi-directional solid-state switch 204 to provide fault and overcurrent protection. Including the air gap disconnect unit 208 is preferable in most circumstances and applications, however, since it galvanically isolates the EVSEP's 102's charging station 110 and associated PEV from the rest of the EV charging system 100 when a fault or other potentially hazardous situation occurs.

Figure 5A:
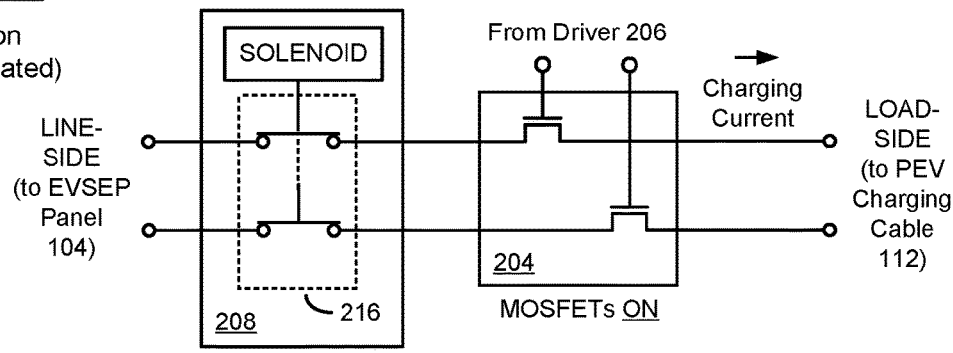
FIG. 5A is a drawing depicting how the bi-directional solid-state switch and air gap disconnect unit of an EVSEP are configured when the EVSEP is in an "ON" state.
Figure 5B:
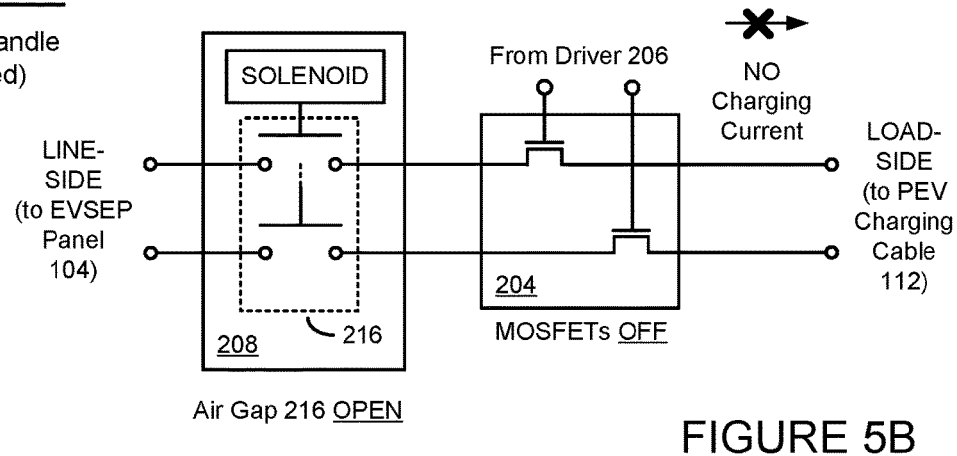
FIG. 5B is a drawing depicting how the bi-directional solid-state switch and air gap disconnect unit of an EVSEP are configured when the EVSEP is in an "OFF" state.
Figure 5C:
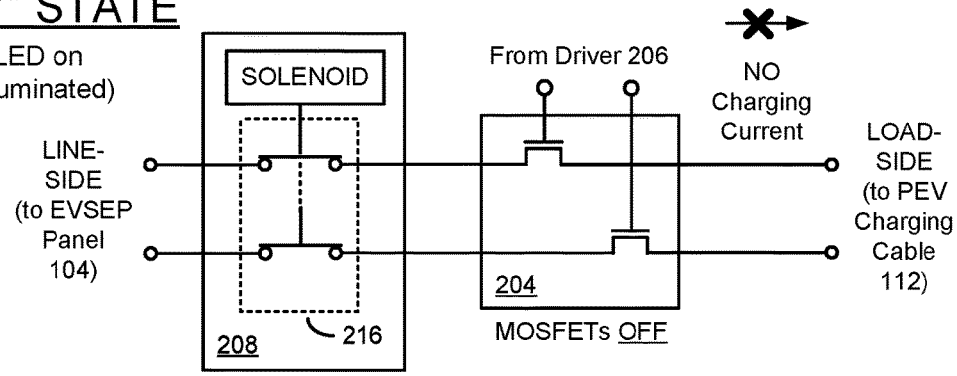
FIG. 5C is a drawing depicting how the bi-directional solid-state switch and air gap disconnect unit of an EVSEP are configured when the EVSEP is in a "STANDBY" state.

At any given time during operation of the EV charging system 100, each EVSEP 102 in the EVSEP panel 104 is configured in one of three possible states: an "ON" state, an "OFF" state, or a "STANDBY" state. These three states are illustrated in FIGS. 5A-5C. When in the "ON" state (FIG. 5A), the air-gap disconnect unit 208 is configured so that the air gap 216 is closed and the bi-directional solid-state switch 204 is ON. It is only in this "ON" state that the EVSEP 102 allows charging current to flow to its associated charging station 110 and connected PEV. During charging, the charging current supplied from the EVSEP panel 104 flows through the associated EVSEP 102 (i.e., through the closed air gap 216 of the air-gap disconnect unit and the ON bi-directional solid-state switch 204), through corresponding electrical power distribution cables 106, charging cable 112, J-Box 108, and charging station 110, and finally to the battery charger located in the PEV connected to the associated charging station 110. Each EVSEP 102 in the EVSEP panel 104 is configured to protect an associated load circuit containing the charging station 110 and plugged-in PEV, and will transition to the OFF state if the EVSEP 102 detects a short circuit in the electrical power distribution cables 106, charging cable 112, J-Box 108, charging station 110, or plugged-in PEV. As will be become more clear from the description that follows, the EVSEPs 102 also transition rapidly back and forth between the ON and STANDBY, as source and load conditions change, allowing the MCUs 202 in the EVSEPs 102 to dynamically adjust, individually and collectively, the maximum allowable charging currents their respective charging stations 110 can draw.

An EVSEP 102 will be configured in the "ON" state only if: 1) the PEV is properly plugged into the associated EVSEP's 102's charging station (as verified, for example, by a proximity check performed by and between the charging station's charging cable handle 114 and PEV), and 2) the EVSEP's MCU 202 has completed negotiating and setting a maximum allowable charging current for the PEV. Once those criteria are satisfied and the PEV commences charging, the EVSEP's MCU 202 continuously monitors the charging current based on measurements taken by the EVSEP's 102's Hall effect sensors 210. As charging progresses, the EVSEP's MCU 202 communicates with the MCUs 202 in all other EVSEPs in the EV charging system 100 that are distributing charging currents to their respective charging stations 110, via the EVSEP communications bus 116, and repeatedly and continuously calculates and re-calculates the amount of EVSEP panel 104 supply current that is available for supply to the EVSEP's associated charging station 110, as will be described in more detail below.

FIG. 5B shows the configuration of an EVSEP 102 when in the OFF state. An EVSEP 102 will transition to the OFF state in the unlikely and unfortunate event of a fault (e.g., short circuit) occurring in the EVSEP's load circuit, or if for some reason the EVSEP 102 is unable to adjust its charge control settings in a manner that allows charging current to flow to its connected PEV. These anomalies will be detected or determined by the EVSEP's MCU 202, with the aid of the EVSEPs Hall effect sensors 210, and upon being detected or determined the EVSEP's MCU 202 will direct the driver circuit 206 to switch the bi-directional solid-state switch 204 OFF, as soon as it is possible, and will also generate a solenoid trigger signal that triggers the solenoid in the air-gap disconnect unit 208 to open the air gap 216, as previously described.

The third and final state that the EVSEPs 102 can be configured in is the "STANDBY" state (see FIG. 5C). The STANDBY state may be thought of as the default state, since it is the state EVSEPs 102 remain in while waiting for PEVs to connect to their associated charging stations 110. It is also the state that an EVSEP 102 temporarily transitions to after a PEV has already commenced charging, upon the EVSEP 102 determining that it is necessary or desired to dynamically adjust its charge control and/or circuit protection settings. When a PEV plugs into one of the charging stations 110, the EVSEP 102 associated with that charging station 110 verifies that the PEV is properly plugged in (for example, as verified by a proximity check performed between the charging station's charging cable handle 114 and PEV's charge controller). After the PEV has properly plugged in, the PEV requests a desired charging current I_REQ from the EVSEP 102, according to a control pilot procedure that may or may not be standardized. The EVSEP's MCU 202 then either honors the request or negotiates a lower charging current if, for example, the current available for supply from the EVSEP panel 104 is insufficient to meet the request. In either event, once the EVSEP 102 and PEV have negotiated a maximum allowable charging current I_CHARGE, the EVSEP's MCU 202 then adjusts the circuit protection it provides based on the negotiated maximum allowable charging current I_CHARGE. In one embodiment of the invention the MCU 202 in each EVSEP 102 is configured to adjust the EVSEP's continuous current rating Ir based on the negotiated maximum allowable charging current I_CHARGE (for example, Ir=125% of I_CHARGE) and the bi-directional solid-state switch 204 in each EVSEP 102 is controlled to provide overcurrent protection over a long-time delay current range, similar to as depicted in FIG. 3.

From the foregoing description it should be clear that the maximum allowable charging current I_CHARGE set by an EVSEP 102 is not static. Rather, it varies and is dynamically adjusted by the EVSEP's MCU 202 over time. At any given time the current available for supply I_AVAIL to any given EVSEP 102 depends both on the total current supply I_SUPP available from the EVSEP panel 104 and the sum of all currents allocated to the EVSEPs 102 ($I_1+I_2+I_3+\ldots$) in the EV charging system 100. In other words, I_AVAIL=I_SUPP−($I_1+I_2+I_3+\ldots$). As will be explained in more detail below, the EV charging system 100 adjusts the allocated currents ($I_1+I_2+I_3+\ldots$) as PEVs plug into the charging stations 100 to charge and as PEVs complete charging and unplug from the charging stations 110. The MCUs 202 in the EVSEPs 102 communicate and coordinate with one another over the EVSEP communications bus 116 to determine how and when adjustments to the allocated currents ($I_1+I_2+I_3+\ldots$) are needed or desired, and the EVSEPs 102 dynamically adjust their maximum allowable charging currents I_CHARGE in response to changes made to the allocated currents ($I_1+I_2+I_3+\ldots$). Note that in most circumstances each EVSEP 102 will utilize the full amount of current allotted to it, in other words, will dynamically adjust its maximum allowable charging current I_CHARGE to match the full amount of current allocated to it (but not necessarily in all circumstances).

In addition to the circuit protection provided by the bi-directional solid-state switches 204, each of the EVSEPs 102 further includes a ground-fault circuit interrupter (GFCI) 214. The GFCI 214 comprises a differential current transformer and GFCI sensing circuit that continuously monitors the currents flowing through the current carrying conductors L1 and L2 conductor. Any detected imbalance in the two currents is indicative of a possible ground fault (GF). Accordingly, when an imbalance is detected, the GFCI sensing circuit sends a GF detect signal to the EVSEP's 102's MCU 202, which then responds as quickly as possible to transition the EVSEP 102 to the OFF state (by triggering the air-gap disconnect unit 208 to disengage and open the air gap 216 and directing the driver circuit 206 to switch the bi-directional solid-state switch 204 OFF, as previously described). It should be mentioned that some conventional (prior art) EVSEs are also equipped with some sort of GFCI capability. However, GFCI protection in conventional EVSEs is only operable when the charging cable is plugged into the PEV. In contrast, the EVSEPs 102 of the present invention have the ability to detect and isolate ground faults both when the charging cable 112 is plugged into the PEV and when the charging cable 112 is unplugged. The additional ability to detect and respond to ground faults when the charging cable 112 is unplugged from the PEV follows from the EVSEP's 102's ability to detect leakage currents flowing through its bi-directional solid-state switch 204 when the EVSEP 102 is in the STANDBY state (the state the EVSEP 102 is nominally in when not electrically connected to a PEV). The additional ground fault protection provided by the EVSEP 102 is a significant safety feature since during use the charging cable 112 can weaken to the point that one of its conductors becomes exposed (e.g., due to aging, normal wear and tear, or because of being ran over by a vehicle). The exposed conductor creates a shock hazard condition that the associated EVSEP's GFCI 214 has the ability to detect as a ground fault, even when the charging cable 112 is unplugged and stored on the associated charging station's 110's pedestal. Accordingly, once the GFCI 214 detects the fault condition, the EVSEP 102 transitions as quickly as possible from the STANDBY state to the OFF state, to prevent any further usage of the charging cable 112 and associated charging station 110.

Figure 6A:
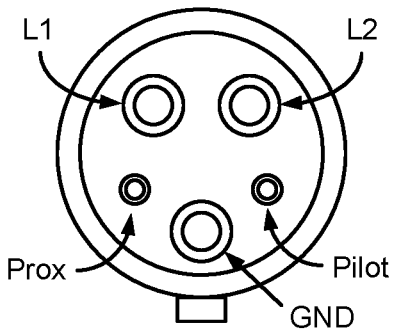
FIG. 6A is a face view drawing of a connector portion of an alternating current (AC) charging cable handle that can be employed at a charging station in the EV charging system depicted in FIG. 1, according to one embodiment of the invention.
Figure 6B:
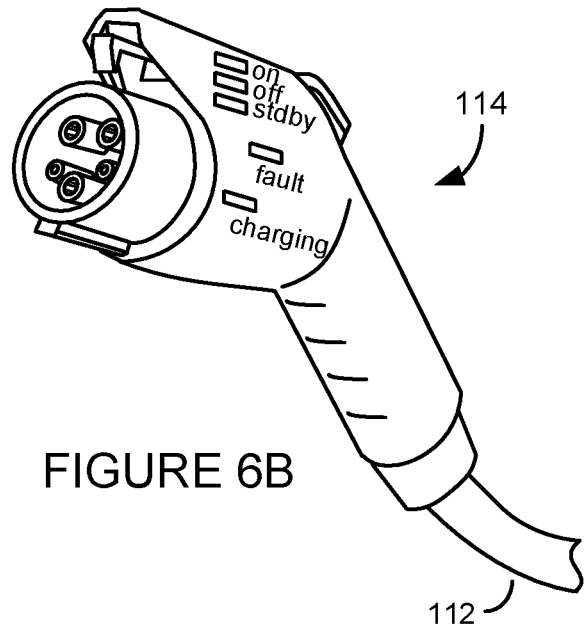
FIG. 6B is a perspective view drawing of an AC charging cable handle that can be employed at a charging station in the EV charging system depicted in FIG. 1, according to one embodiment of the invention.

In one embodiment of the invention the EV charging system 100 and EVSEPs 102 are designed so that they are compliant with the SAE J1772 ("J Plug") standard, support AC Level 2 charging, and utilize an AC charging connector having L1, L2, GND, and control pilot pins similar to as illustrated in FIG. 6A. Additionally, in one embodiment of the invention (see FIG. 6B) the handles 114 of the charging cables 112 include light-emitting diodes (LED) that indicate the current status of the charging station 110 and associated EVSEP 102: for example, one or more of: ON (green LED), STANDBY (yellow LED), and OFF (red LED), and in another embodiment of the invention also or alternatively include an LED indicator that indicates the charging station 110 is currently supplying charging current to a connected PEV (or conversely, indicating that charging has completed), and an LED indicator that cautions users of a possible fault condition. It should be mentioned that whereas the connector pins in the exemplary handle 114 depicted in FIG. 6B are designed to comply with the SAE J1772 standard, the handle 114, EVSEPs 102 and the EV charging system 100 overall should not be construed as being restricted to any given EV charging standard, as they can be easily adapted to comply with essentially any EV charging standard. Accordingly, the present invention should not be construed as being restricted to any particular standard, unless specifically recited in the appended claims.

While including LED indicators on the handle 114 of the charging cable 112 is useful, one or more of the LED indicators can be alternatively (or additionally) mounted in or on pedestals or other equipment at or near the charging stations 110. Electronic displays can also be mounted in or on the charging stations pedestals (or in or on other nearby equipment) and in one embodiment of the invention the CRM 212 in the EVSEPs 102 includes computer program instructions that provide the EVSEPs' MCUs 202 the ability to estimate charging times for PEVs that plug into the charging stations 110, for example, based on the charging currents the EVSEPs 102 supply and battery pack capacities of the PEVs, and display in real time (i.e., as the PEVs charge) estimated times to complete charging on the electronic display.

Figure 7:
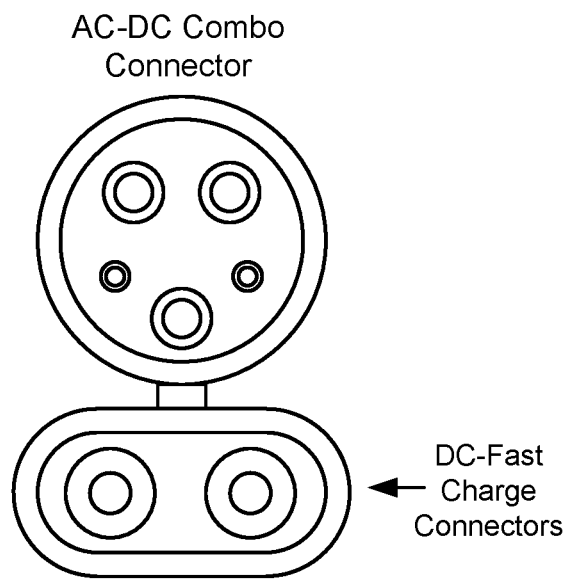
FIG. 7 is a face view drawing of a connector portion of an AC and fast direct current (DC) "combo" connector that can be employed in the EV charging system depicted in FIG. 1, according to one embodiment of the present invention.

The exemplary embodiments of the invention described and illustrated above facilitate AC charging. In other embodiments of the invention the EV charging system 100 is equipped with EVSEPs 102 that have been adapted to supply both AC and DC charging currents, depending on the PEV's needs, in which case an AC and fast DC "combo" connector having a handle/plug with pins similar to that depicted in FIG. 7 is employed. In other embodiments of the invention, the EVSEPs are configured to supply only DC currents, in which case a DC-only type connector may be used.

Referring now to FIGS. 8A-8D, there is shown a flowchart illustrating a charge control and circuit protection method 800 that one of the EVSEPs 102 performs, in accordance with one embodiment of the invention. The exemplary method 800 illustrates and highlights the dynamic circuit protection and dynamic charge control functions the EVSEP 102 performs while operating in the context of the EV charging system 100. At the "START" of the method 800 it is assumed that a PEV has already properly connected to the EVSEP's 102's charging station 110 (e.g., as confirmed by passing a J1772 proximity check performed by and between the charging cable handle 114 and PEV charge controller) and further assumed that the EVSEP 102 is in the STANDBY state and ready to supply charging current to the charging station 110 and connected PEV.

At first step 802 (see FIG. 8A), after detecting that the PEV has connected to the charging station 110, the associated EVSEP 102 begins transmitting a control pilot signal to the PEV's charge controller, via the EVSEP panel gateway 118 and through the associated charging station 110 and charging cable 112. For example, if the SAE J1772 standard is being followed, the control pilot signal is a 1 kHz, +/−12 VDC, 50% duty cycle signal and the MCU 202 of the EVSEP 102 determines that the PEV has connected by detecting and measuring a voltage drop across a resistor divider formed between the connected handle 114 and PEV charge controller. The PEV charge controller responds to the control pilot with a charging current request I_REQ. For example, if the SAE J1772 standard is being followed, the PEV charge controller changes a resistance of one of the resistors in the charge controller, resulting in an additional voltage drop detected by the EVSEP 102 indicative of the charging current request I_REQ. At step 804, the EVSEP's MCU 202 detects the charging current request I_REQ. Then, at step 806 the EVSEP's 102's MCU 202 calculates the current available for supply I_AVAIL from EVSEP panel 104 to the EVSEP 102, i.e., I_AVAIL=I_SUPP−(I$_1$+I$_2$+I$_3$ + . . . ), as previously described. Next, at decision 808, the EVSEP's 102's MCU 202 determines whether the current available for supply I_AVAIL is sufficient to fulfill the PEV's charging current request I_REQ. If the MCU 202 determines that I_AVAIL I_REQ, in other words that sufficient supply current is available ("YES" at decision 808), the method 800 continues at step 810 (see FIG. 8B). At step 810 the EVSEP 102 then honors the PEV's charging current request and sets the maximum allowable charging current to: I_CHARGE=I_REQ. Then, based on the I_CHARGE=I_REQ, at step 812 the EVSEP 102 adjusts the circuit protection settings of its bi-directional solid-state switch 204 accordingly. On the other hand, if the MCU 202 determines that I_AVAIL<I_REQ, in other words that insufficient supply current is available ("NO" at decision 808), the method 800 branches to step 838 to determine an I_CHARGE<I_REQ and the circuit protection settings for the EVSEP's bi-directional solid-state switch 204 are set accordingly (see FIG. 8D, described in detail below).

Assuming that the EVSEP 102 honors the PEV's charging request at step 810 and has set the maximum allowable charging current to I_CHARGE=I_REQ at step 812, before transitioning from the STANDBY state to the ON state and commencing charging, at decision 814 the EVSEP's GFCI 214 performs a ground fault check. If the ground fault test fails ("NO" at decision 814), the method 800 ends and the PEV is not permitted to commence charging. On the other hand, if the ground fault test passes ("YES" at decision 814), indicative of no ground fault present, at step 816 the EVSEP 102 transitions from the STANDBY state to the ON state and begins supplying current to the PEV, according to I_CHARGE=I_REQ and the circuit protection settings of the bi-directional solid-state switch 204 previously set by the EVSEP 102 based on I_CHARGE=I_REQ.

As the PEV charges, the MCU 202 of the associated EVSEP 102 communicates with the MCUs 202 in the other EVSEPs 102 in the EV charging system 100, over the EVSEP communications bus 116, and constantly monitors and continually recalculates the available supply current I_AVAIL. So long as there is no change in I_AVAIL ("NO" at decision 818), the PEV continues charging according to the previously set I_CHARGE and according to the circuit protection settings previously set by the EVSEP 102, as indicated by step 820. As the PEV continues charging, the EVSEP 102 also continues to monitor the charging progress, as indicated by decision 822. If the EVSEP's MCU 202 determines, either by itself or in response to a "charging complete" notification from the PEV, that the PEV has completed charging ("YES" at decision 822), the EVSEP 102 transitions to the STANDBY state and the method 800 ends. However, if the EVSEP's MCU 202 determines that charging has not completed ("NO" at decision 822), at step 826 the EVSEP's MCU 202 recalculates the current available for supply I_AVAIL once again, and at decision 818 queries again whether an adjustment to the maximum allowable charging current I_CHARGE is required. (It should be mentioned that, although not reflected precisely in the flowchart, the calculation in step 826 is preferably, though not necessarily, performed repeatedly and continuously in the background as the EVSEP 102 operates, from the time the PEV plugs into the charging station 110 until charging is completed.) If the EVSEP's MCU 202 ascertains no change in I_AVAIL ("NO" at decision 818), at step 820 charging is allowed to continue according to the previously-set maximum allowable charging current I_CHARGE and previously-set circuit protection settings. However, if the EVSEP's MCU 202 determines that I_AVAIL has in fact changed ("YES" at decision 818), the method 800 continues at decision 826 in FIG. 8C.

There are a number of reasons why the current available for supply I_AVAIL to the EVSEP 102 might change. For example, I_AVAIL may decrease due to another PEV plugging into one of the charging stations 110 or may increase due to another PEV completing charging and unplugging from its charging station 110. I_AVAIL may also decrease or increase due to an increase or decrease in the available supply current fed to the EVSEP panel 104 or in response to a charge distribution rule imposed by a rules-based charge allocation algorithm (described in more detail below). Accordingly, if the EVSEP's MCU 202 determines that I_AVAIL has in fact changed ("YES" at decision 818), the method 800 continues in FIG. 8C and at decision 826 the EVSEP's MCU 202 then determines whether I_AVAIL has increased or decreased. If the EVSEP's MCU 202 determines that the current available for supply I_AVAIL to the EVSEP 102 has increased ("↑" at decision 826), the method 800 continues at step 828. On the other hand, if the EVSEP's MCU 202 determines that the current available for supply I_AVAIL has decreased ("↓" at decision 826), the method 800 continues at step 838 in FIG. 8D.

Assuming that the EVSEP's MCU 202 has determined that the current available for supply I_AVAIL has increased ("↑" at decision 826), at step 828 the EVSEP 102 transitions temporarily to the STANDBY state, and at decision 830 the EVSEP's MCU 202 determines whether the maximum allowable charging current I_CHARGE was previously already set to I_CHARGE=I_REQ (at step 810 above) or was set to a value less than I_REQ, i.e., I_CHARGE<I_REQ, due to the EVSEP's MCU 202 determining at decision 808 that insufficient current was then available to honor the PEV's charging current request I_REQ. If the EVSEP's MCU 202 determines that I_CHARGE is already set to I_REQ, i.e., that I_CHARGE=I_REQ ("YES" at decision 830), the EVSEP 102 quickly transitions back to the ON state at step 832 and the method 800 then branches back to step 820 in the flowchart (see FIG. 8B) with the EVSEP 102 configured according to the previously-set allocated charge I_CHARGE=I_REQ and previously-set circuit protection settings. However, if at decision 830 the EVSEP's MCU 202 determines that I_CHARGE was set to a value less than I_REQ, i.e., was set to I_CHARGE<I_REQ due to the EVSEP's MCU 202 determining at decision 810 that insufficient current was then available to honor the PEV's charging current request I_REQ (see steps FIG. 8D below), at step 832 the EVSEP's MCU 202 increases the maximum allowable charging current from I_CHARGE<I_REQ to I_CHARGE=I_REQ (or to the maximum charging current available), and at step 834 readjusts the circuit protection settings of its bi-directional solid-state switch 204 accordingly. After the EVSEP's 102's maximum allowable charging current has been readjusted to I_CHARGE=I_REQ and its circuit protection settings have been readjusted, at step 836 the EVSEP 102 transitions back to the ON state. Then the method 800 branches back to step 820 in the flowchart (see FIG. 8A) with the EVSEP 102 configured to operate according to the updated (readjusted) maximum allowable charging current I_CHARGE=I_REQ and updated (readjusted) circuit protection settings.

Figure 8A:
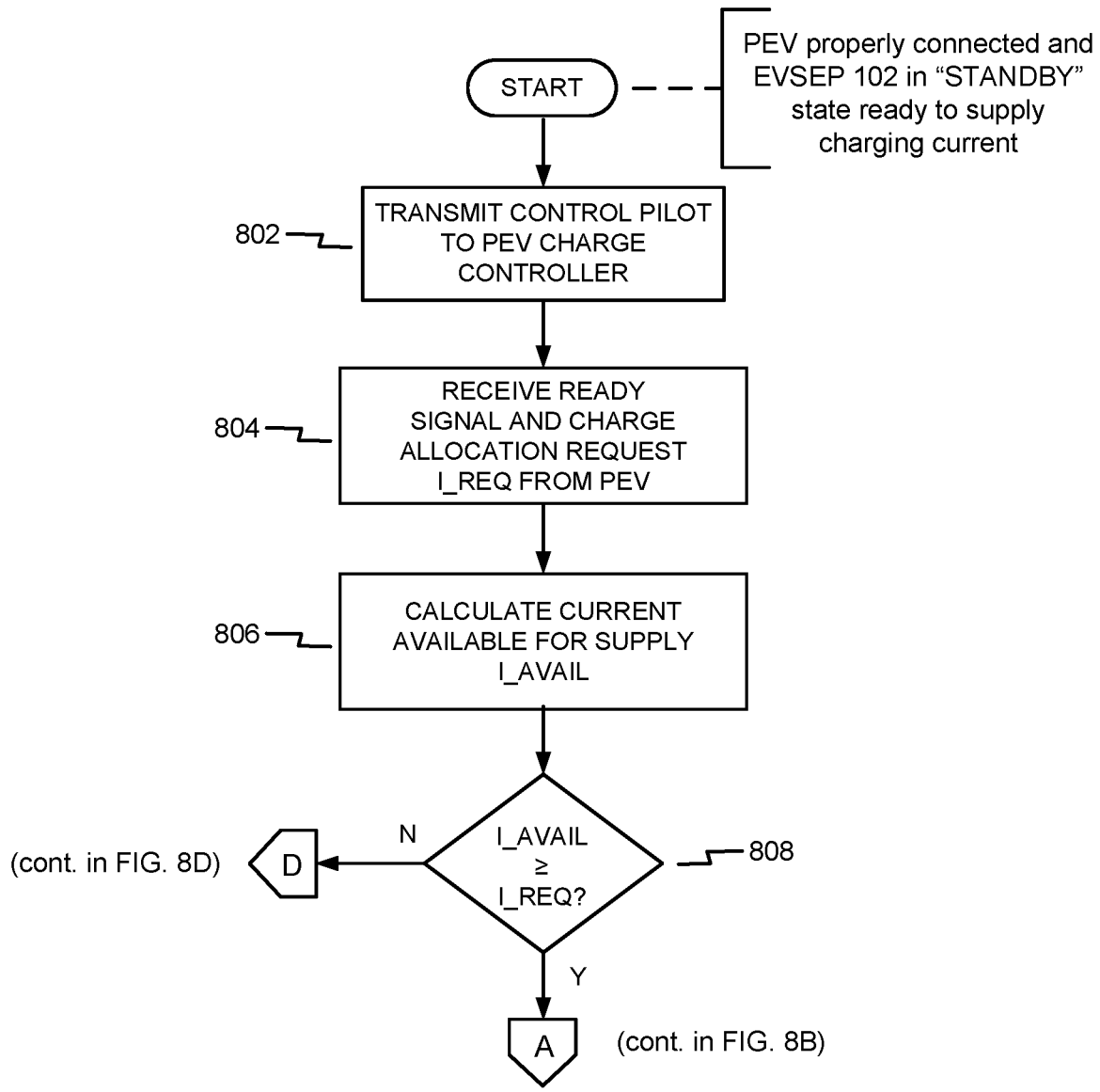
FIG. 8A is a first portion of a flowchart of a charge control and circuit protection method that an EVSEP performs, according to an embodiment of the present invention.
Figure 8B:
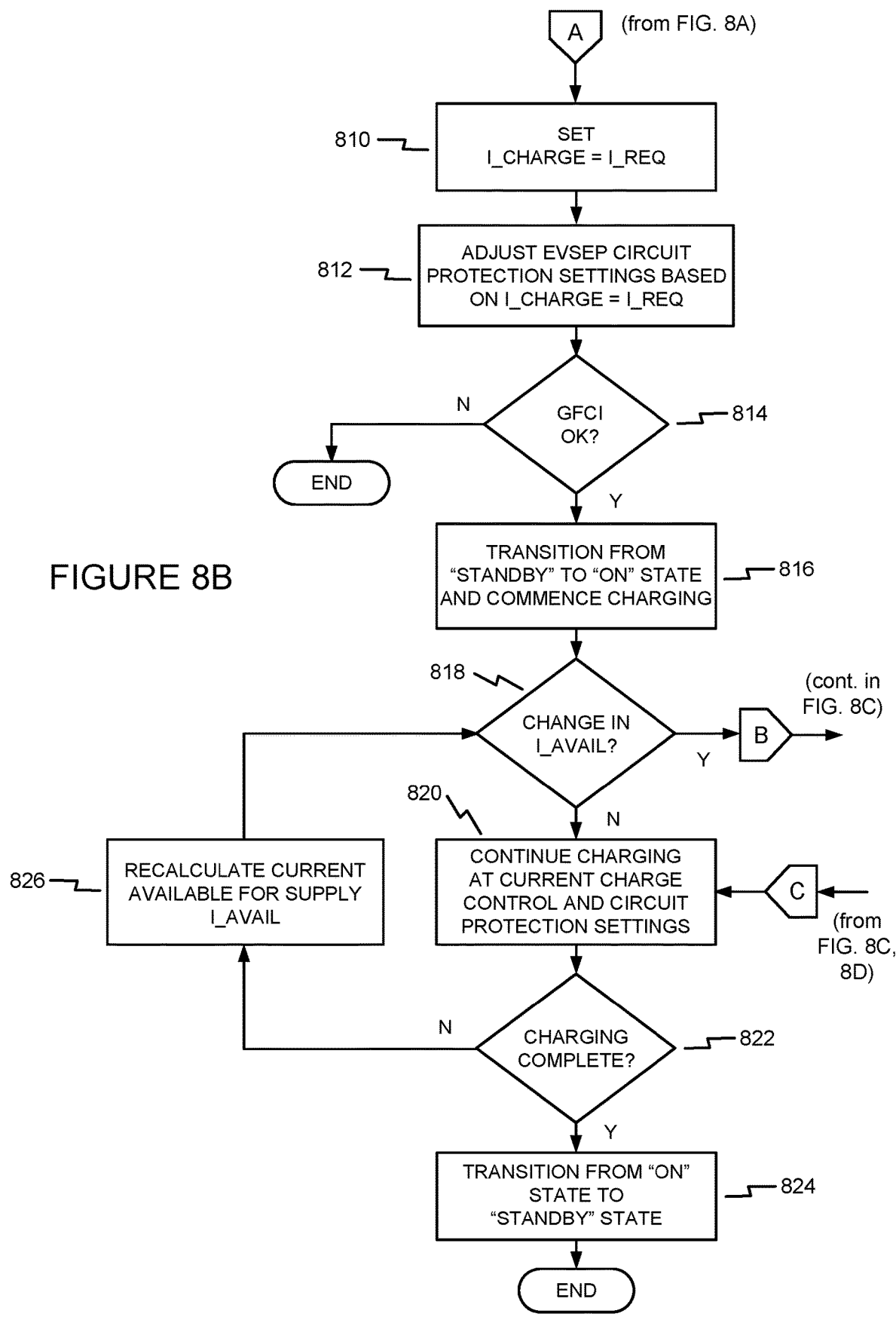
FIG. 8B is a second portion of a flowchart of a charge control and circuit protection method that an EVSEP performs, according to an embodiment of the present invention.
Figure 8C:
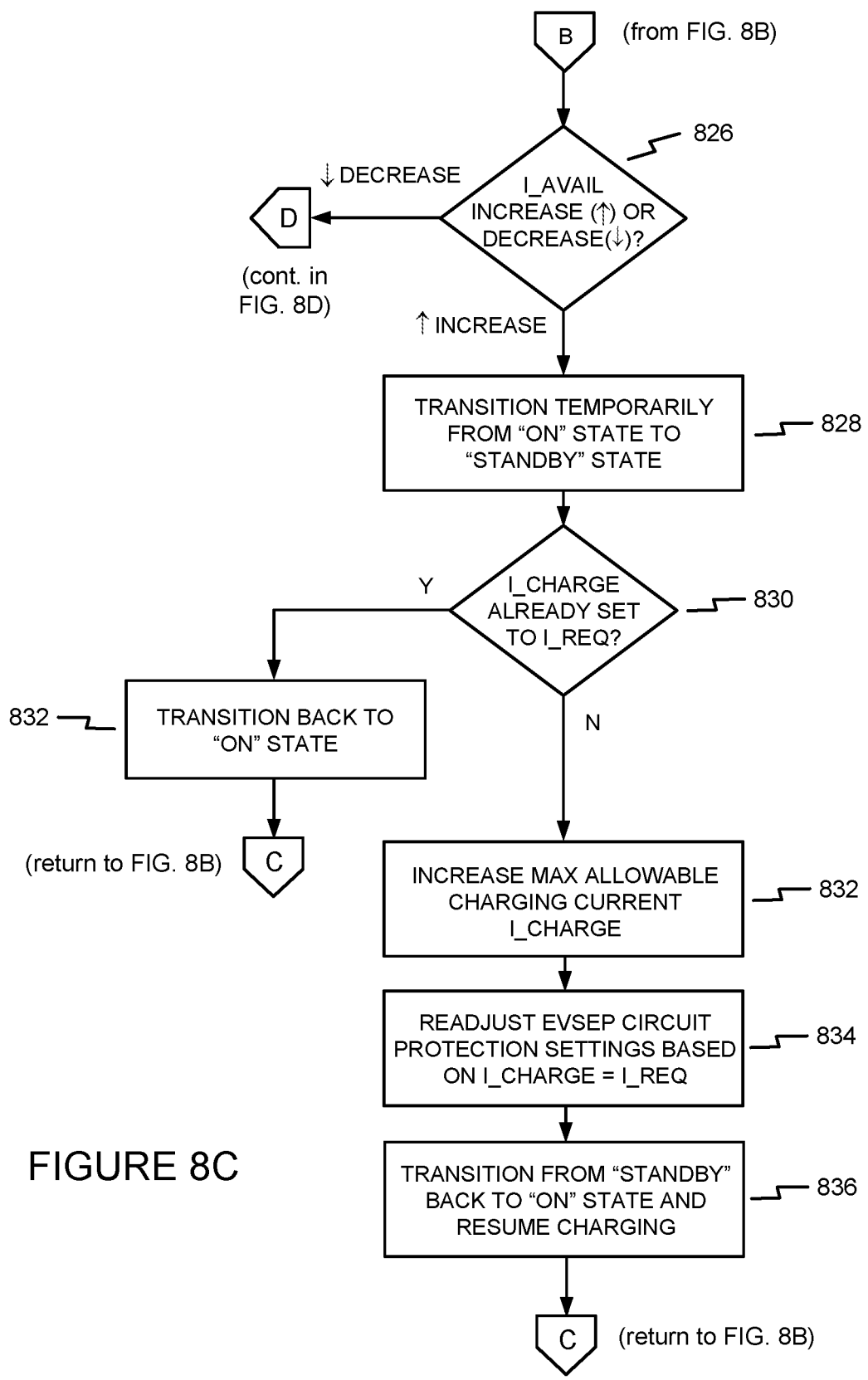
FIG. 8C is a third portion of a flowchart of a charge control and circuit protection method that an EVSEP performs, according to an embodiment of the present invention.
Figure 8D:
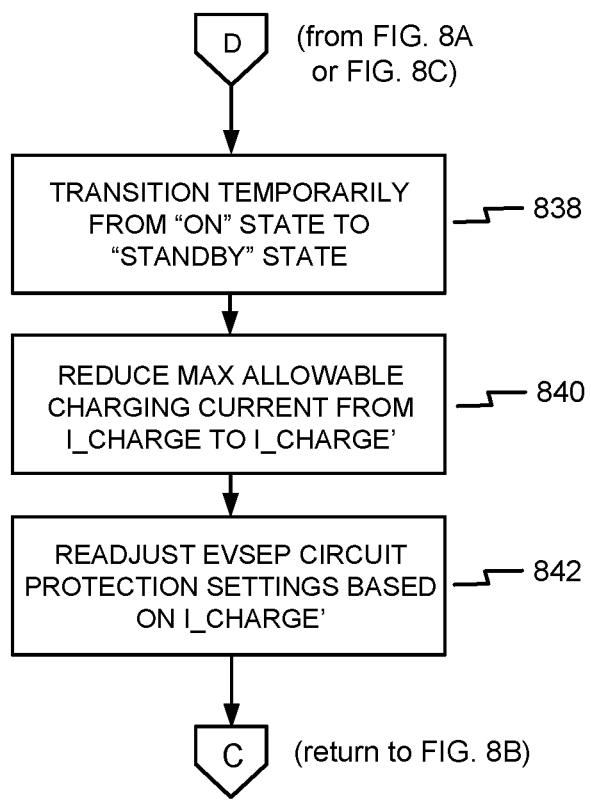
FIG. 8D is a fourth portion of a flowchart of a charge control and circuit protection method that an EVSEP performs, according to an embodiment of the present invention.

If the EVSEP 102 has determined at decision 826 that the current available for supply I_AVAIL to the EVSEP 102 has decreased, rather than increased (as discussed in reference to FIG. 8B) or the EVSEP's MCU 202 determines that insufficient current is available to honor the PEV's charging current request I_REQ at decision 808 (during the time the PEV first plugs into the charging station 110), the method 800 continues at step 838 in FIG. 8D. Accordingly, at step 838 the EVSEP 102 temporarily transitions to the STANDBY state, after which, at step 840, specifically, the EVSEP's MCU 202 reduces the maximum allowable charging current from I_CHARGE to I_CHARGE' (I_CHARGE'<I_CHARGE≤I_AVAIL) and readjusts its circuit protection settings based on the magnitude of the new maximum allowable charging current I_CHARGE' at step 842. After the EVSEP's 102's maximum allowable charging current I_CHARGE' and circuit protection settings have been readjusted, the method 800 branches back to step 820 in the flowchart (see FIG. 8B) with the EVSEP 102 configured to operate according to the updated (readjusted) maximum allowable charging current I_CHARGE' and updated (readjusted) circuit protection settings. The method 800 then continues in the manner described above, until the EVSEP's MCU 202 determines at decision 822 that the PEV has completed charging ("YES" at decision 822), after which the method 800 ends.

It should be emphasized that the various steps and decisions in the exemplary method 800 described above are not necessarily performed in the order shown in the flowchart. Some steps and decisions in the method 800 are, or may be, performed constantly, continuously, or simultaneously, e.g. in the background, as the method 800 is performed, rather than as a chronological sequence of events. For example, for safety reasons the GFCI check at decision 814 is preferably performed constantly, even when a PEV is not plugged into the EVSEP's 102's associated charging station 100, and, as was mentioned above, the calculation in step 826 is preferably performed repeatedly and continuously in the background by the EVSEP's MCU 202 as the EVSEP 102 supplies current to its associated charging station 110 and as source and load conditions in the EV charging system 100 change.

It is also important to point out that the exemplary method 800 is an illustration of how just a single one of the EVSEPs 102 in the EV charging system 100 dynamically adjusts its charge control and circuit protection functions as source and load conditions change over time. In a preferred embodiment of the invention, all of the other EVSEPs 102 in the EV charging system that are distributing charging currents to their respective charging stations 110 perform substantially the same method 800. In one embodiment of the invention the plurality of EVSEPs 102 are configured to operate collectively, with their respective MCUs 202 communicating with one another and exchanging source and load information over the EVSEP communications bus 116 in real time, to dynamically coordinate an allocation (or apportionment) of the total supply current I_SUPP available from the EVSEP panel 104 among the EVSEPs 102. As the EV charging system 100 operates, the MCUs 202 in the EVSEPs 102 repeatedly and continuously monitor the sum of all allocated currents ($I_1+I_2+I_3+\ldots$), so that the total supply current I_SUPPL available from the EVSEP panel 104 is never exceeded. Whenever the MCUs 202 determine that insufficient current is available from the EVSEP panel 104 to satisfy the charging current request I_REQ of any or more charging stations 110 and associated PEVs, the allocated currents are reallocated or reapportioned and the MCUs 102 in the one or more of the EVSEPs 102 lower their maximum allowable charging currents, from I_CHARGE to I_CHARGE', similar to as described above, so that the total current drawn from by the EVSEPs 102 does not exceed the total current supply I_SUPP available from the EVSEP panel 104. The EVSEPs 102 then also readjust their circuit protection setting based on the reduced maximum allowable charging currents I_CHARGE. This collective and coordinated dynamic charge allocation and dynamic circuit protection process is performed continuously by the EVSEPs 102 as the EV charging system 100 operates. By apportioning the total supply current I_SUPP available from the EVSEP panel 104 among the EVSEPs 102, all PEV are able to continue charging, albeit with one or more PEVs charging at a lower charging current I_REQ than requested. Apportioning and allocating also allows an additional PEV to connect to the EV charging system 100 and charge. Although the charging current allocated to it via the associated EVSEP 102 and charging station 110 will also be less than the charging current it requests, the additional PEV will nevertheless be able to charge, whereas if no apportionment was made the additional PEV would have to wait for other PEVs to complete charging before it could commence charging.

There are various ways the MCUs 202 in the EVSEPs 102 can be programmed to allocate or apportion the total supply current I_SUPP among the EVSEPs 102. In one embodiment of the invention, the total supply current I_SUPPL is simply allocated equally among the EVSEPs 102/charging stations 110. In other words, the total supply current I_SUPP is divided by the number of charging stations 110 in use and each EVSEP 102. In another embodiment of the invention, a weighting-based algorithm is employed, according to which the MCUs 202 in the EVSEPs 102 track and monitor the time each of the PEVs has been charging, receive battery information from the individual PEVs, including their individual battery capacities, and estimate the time it will take for each of the PEVs to complete charging at a given charging current. Weighing these factors, the EVSEPs 102 then apportion the total supply current I_SUPP among the EVSEPs 102 similar to as illustrated in FIG. 9. In another embodiment of the invention, some PEVs are given priority over others, for example, in response to a PEV user indicating to the EV charging system 100 a willingness to pay a higher price for charging. FIG. 10 illustrates for example, how the weighting-based algorithm depicted in FIG. 9 can be modified to include this priority-based dependency. Whichever algorithm is employed, each time the EV charging system 100 makes an adjustment to the allocated currents ($I_1+I_2+I_3+\ldots$), one or more of the EVSEPs 102 then adjust its/their maximum allowable charging current I_CHARGE and also preferably, though not necessarily, readjusts its/their circuit protection settings based on the new value of I_CHARGE. The EVSEPs 102 perform these adjustments dynamically and in real time as the EV charging system 100 operates. Note that the circuit protection adjustments made in the examples presented in FIGS. 9 and 10 involve adjustments to the continuous current ratings Ir of the EVSEPs 102. The continuous current ratings Ir are calculated and set and recalculated and reset dynamically by the EVSEPs' MCUs 202 as currents to the EVSEPs in the EV charging system 100 are allocated and reallocated. For example, as illustrated in FIG. 9, after the current allocated to Vehicle A has been lowered from 50 A to 20 A (due to Vehicle B plugging into charge), the EVSEP associated with Vehicle A then lowers its continuous current rating Ir from 62.5 A (125% of 50 A) to 25 A (125% of 20 A). Although not indicated in FIGS. 9 and 10, those of ordinary skill in the art will appreciate and understand from the teachings of this disclosure that other circuit protection attributes of the EVSEPs, besides just the continuous current ratings Ir, may also (or alternatively) be dynamically adjusted as the EV charging system 100 operates. For example, the long-time delay, short-time delay, and/or instantaneous pickup settings of any one or more of the EVSEPs can also (or alternatively) be adjusted if desired or as conditions warrant.

It should be mentioned that the weight-based charge allocation algorithms depicted in FIGS. 9 and 10 are just two examples of how the EVSEPs 102 can be configured to operate when the total current supply I_SUPPL available from the EVSEP panel 104 may be insufficient to satisfy the charging current requests of PEVs. For example, in one embodiment of the invention, in stead of apportioning the total current supply I_SUPPL among the EVSEPs 102 and allowing PEVs to charge all at the same time, the MCUs 202 in the EVSEPs 102 are programmed so that the EVSEPs 102 are allowed to charge, perhaps at their full requested charging currents I_REQ, according to a time-slotted schedule, whereby one or more of the EVSEPs 102 supplying charging currents temporarily transition(s) to the STANDBY state while one or more of the other EVSEPs 102 are given priority and allowed to continue supplying charging current to their respective charging stations 110 and connect PEVs. Once the PEV(s) associated with the priority EVSEP(s) 102 has/have completed charging in its/their scheduled time slots, the remaining EVSEPs 102 that had previously transitioned to the STANDBY state transition back to the ON state to complete the charging of their PEVs, for example, in one or more subsequent time slots.

It should also be mentioned that the dynamic charge control and dynamic circuit protection capabilities of the EV charging system, including any one of the rules-based charging allocation algorithms discussed above, can be designed to extend across multiple EVSEP panels that are configured in a more expansive EV charging system network. All that would be required to implement the more expansive EV charging system would be to construct communications links between the various EVSEP panels. In this more expansive EV charging system the total current supply I_SUPPL available at any one of the EVSEP panels could be increased or decreased as desired or necessary, even as the various EVSEPs 102 dynamically coordinate the allocation or apportionment of charging currents to the various EVSEPs 102. A dynamic allocation scheme, similar to described above, could also be implemented at the panel level.

The ability of the EVSEPs 102 to individually and collectively dynamically adjust their maximum allowable charging currents and circuit protection settings is beneficial since it avoids uneven usage of the EV charging system infrastructure. The more even usage avoids the one-size-fits-all approach of conventional EV charging systems, which requires use of oversized power distribution equipment, yet still allows most every PEV charging need to be accommodated. Another advantage the EV charging system 100 has over conventional EV charging systems is that the dynamic charge control and dynamic circuit protection functions are performed locally, with the EVSEPs' MCUs' 102 communicating, cooperating, and coordinating with one another over the EVSEP communications bus 116. No centralized computer is required and no cloud connection or network is required, thus avoiding a centralized control scheme that would undesirably pose as a single point of failure and make the EV charging system vulnerable to hackers and cyber attacks. Yet another advantage the EV charging system 100 has over conventional EV charging systems is that the frame sizes of the EVSEPs 102 are configurable. This attribute is afforded by the EVSEPs 102 use of bi-directional solid-state switches 204 to provide short-circuit and overcurrent protection. This frame-size configurability is not possible in prior art EV charging systems, which rely on electromechanical circuit breakers, external to the EV charging system, for circuit protection.

Figure 11:
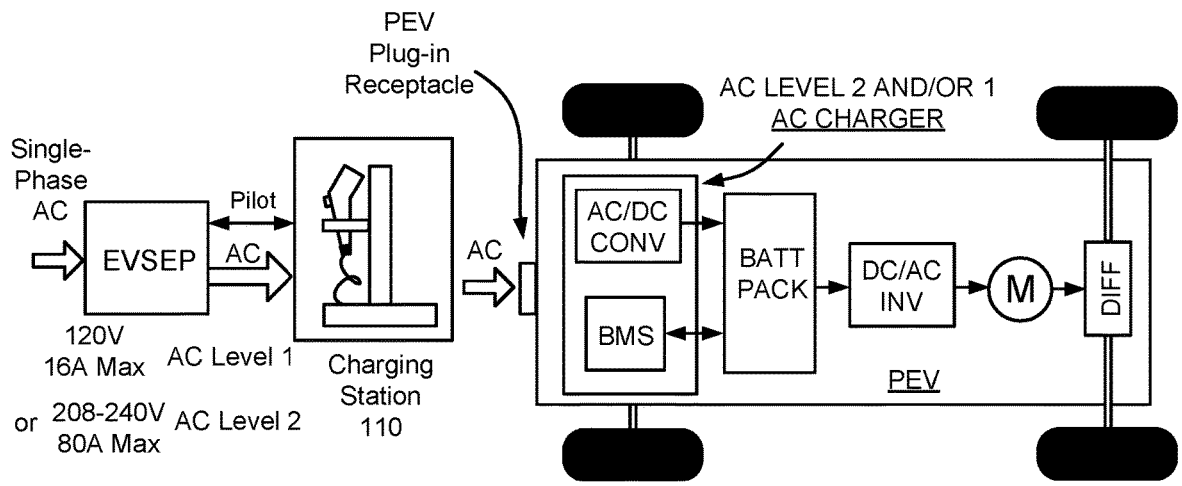
FIG. 11 is a drawing illustrating how an EVSEP and associated EV charging station are configured in relation to a plug-in EV (PEV) that supports AC charging, according to one embodiment of the present invention.
Figure 12:
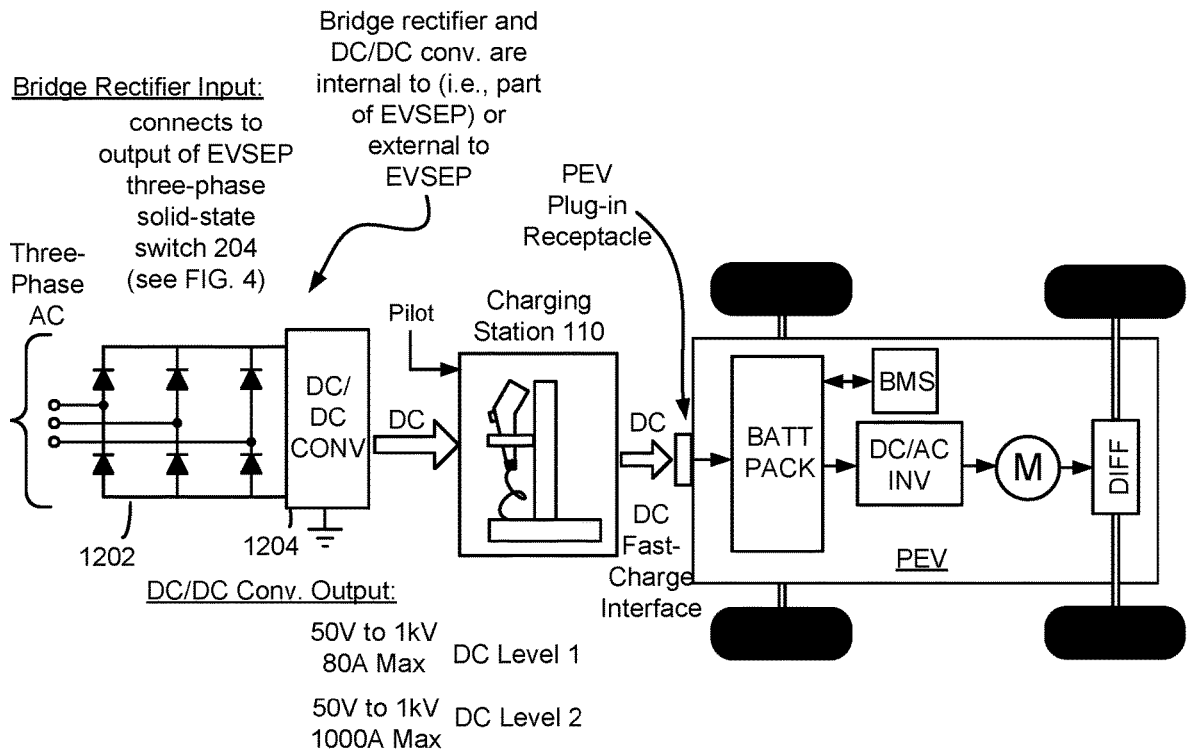
FIG. 12 is a drawing illustrating how a modified EVSEP, designed and constructed to support DC-fast charging, and associated EV charging station are configured in relation to a PEV that supports DC-fast charging, according to one embodiment of the present invention.

The exemplary EV charging system 100 and EVSEPs 102 described above are well-suited for AC PEV charging, in particular, SAE J1772 AC Level 1 (120 VAC, 16 A Max) and/or AC Level 2 (208-240 VAC, 80 A Max) PEV charging. This AC charging configuration is illustrated in FIG. 11. In another embodiment of the invention, the EVSEPs 102 are modified so that they are capable of supporting DC-fast charging, for example, SAE J1772 DC Level 1 (50V to 1 kV, 80 A Max) and/or DC Level 2 (50V to 1 kV, 1000 A Max) PEV charging, as illustrated in FIG. 12. To support DC charging, in one embodiment of the invention each of the EVSEPs 102 is modified to further include an AC/DC converter, for example, a three-phase AC-to-DC bridge rectifier 1202 (as shown in FIG. 12) in the case of a three-phase AC charging system. The three-phase bridge rectifier 1202 is configured to mate with a three-phase implementation of the bi-directional solid-state switch 204 (similar to that depicted in FIG. 4). The modified EVSEP 102 further includes a DC/DC converter 1204 that steps the converted DC voltage down to a level suitable for charging. All of the other functions and capabilities of the AC version of the EVSEPs 102 described above, including the dynamically adjustable circuit protection charge control capabilities are included in the modified (i.e., DC-fast charging) version of the EVSEP 102 depicted in FIG. 12.

In one embodiment of the invention the bi-directional solid-state switches 204 in the DC-modified versions of the EVSEPs 102 are not only configured and controlled by their respective MCUs 202 to provide dynamically adjustable circuit protection, the MOSFETs in the bi-directional solid-state switches 204 are further configured and controlled to serve as a front end for power factor correction. In yet another embodiment of the invention, the bi-directional solid-state switches 204 are also (or alternatively) configured to regulate the DC voltage produced at the output of the bridge rectifier 1202 or output of the DC/DC converter 1204.

Figure 13:
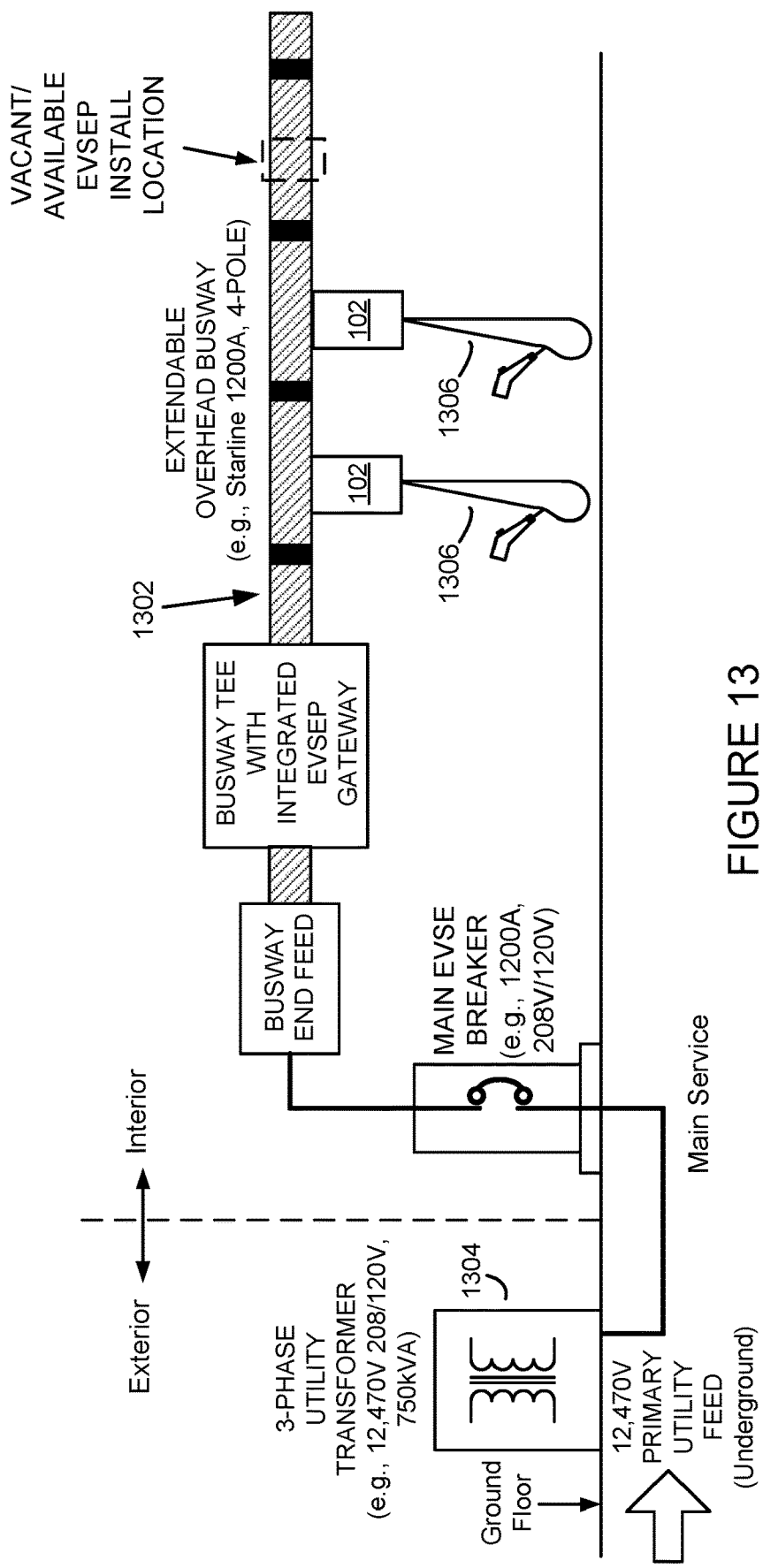
FIG. 13 is a drawing depicting an EV charging system that is adapted and well-suited to serve as a fleet charging facility for EV buses and other municipal EVs, according to an embodiment of the present invention.

FIG. 13 is a drawing depicting an EV charging system 1300, according to another embodiment of the present invention. The EV charging system 1300 is particularly well-suited to serve as a fleet charging facility, for example, for EV buses used by a municipality. The EV charging system 1300 comprises an overhead busway 1302 (e.g., Starline 1200 A, 4-pole) that distributes AC power supplied from two or three phases of the secondary winding of a three-phase utility transformer 1304 to a plurality of EVSEPs 102 configured along the overhead busway 1302. Because of the high currents (up to and possibly above 1000 A) that can be supplied by secondary of the utility transformer 1304, the EV charging system's main service is preferably distributed underground, for example, with each of the conductors, L1, L2, L3 (if three-phase) routed in separate PVC conduits/pipes (e.g., 4", schedule 40 PVC conduits). Instead of configuring and housing the EVSEPs 102 within a distribution panel, the EVSEPs 102 are configured as busplugs that connect, i.e., "plug into" matching receptacles configured at various locations in the overhead busway 1302. Additional charging stations can be added by simply plugging additional EVSEPs/busplugs 102 into vacant receptacles and attaching corresponding charging cables 1306 to the busplugs along the busway 1302. The EV charging system 1300 supports, AC and DC charging, by simply plugging in one of the EVSEPs 102 like that used in FIG. 11 (AC charging) or the EVSEP 102 depicted in FIG. 12, which has been modified to include bridge rectifier 1202 and DC/DC converter 1204 (DC-fast charging).

In the EV charging system 1300 described above, DC-fast charging is supported by modifying the EVSEPs 102 to include a bridge rectifier 1202 and DC/DC converter 1204. In an alternative embodiment, a single, large AC/DC converter is employed to convert the large line-to-line AC voltages (e.g., 480 VAC) at the utility transformer 1304 secondary, thus obviating the need to perform the AC/DC conversion at the outputs of the EVSEPs 102. With that modification made, the EV charging system 1300 becomes a DC-fast-charging-only facility.

While various embodiments of the present invention have been described, they have been presented by way of example and not limitation. It will be apparent to persons skilled in the relevant art that various changes in form and detail may be made to the exemplary embodiments without departing from the true spirit and scope of the invention. Accordingly, the scope of the invention should not be limited by the specifics of the exemplary embodiments but, instead, should be determined by the appended claims, including the full scope of equivalents to which such claims are entitled.

The invention claimed is:

1. An electric vehicle (EV) charging system, comprising:
a plurality of EV charging stations;
a plurality of EV supply equipment (EVSE) units associated with the plurality of EV charging stations, each EVSE unit including a microcontroller unit (MCU) and a solid-state switch that controls whether electrical current is able to flow to said each EVSE unit's associated EV charging station, wherein each EVSE unit of the plurality of EVSE units further comprises a closeable air gap connected in series with said each EVSE unit's associated solid-state switch, between input line-side terminals and output load-side terminals of said each EVSE unit and each EVSE unit is configurable in three possible states and at any given time is configured in one of said three possible states:

an ON state during which the closeable air gap is closed and the solid-state switch in said each EVSE unit is ON;
a STANDBY state during which the closeable air gap is closed and the solid-state switch in said each EVSE unit is OFF; and
an OFF state during which the closeable air gap is open and the solid-state switch in said each EVSE unit is OFF;
electrical power distribution wires or cables that distribute electrical power from the plurality of EVSE units to the plurality of EV charging stations;
an EVSE communications bus over which the MCUs in the plurality of EVSE units communicate, coordinate, and allocate or apportion an available supply current among the plurality of EVSE units,
wherein the plurality of MCUs is configured to reallocate or reapportion the available supply current among the plurality of EVSE units upon plug-in electric vehicles (PEVs) plugging into the EV charging stations to charge and upon PEVs completing charging and unplugging from the EV charging stations and the plurality of solid-state switches is configured to provide circuit protection to a plurality of associated EV charging stations and PEVs.

2. The EV charging system of claim 1, wherein the MCUs in one or more of the EVSE units are further configured to adjust one or more circuit protection attributes of their associated solid-state switches as the plurality of EVSE units reallocates or reapportions the available supply current.

3. The EV charging system of claim 1, further comprising an EVSE panel that supplies the available supply current and within which the EVSE communications bus and plurality of EVSE units are electrically and communicatively configured.

4. The EVSE charging system of claim 1, further comprising a gateway through which control pilot signals and other charge control information is conveyed, communicated or exchanged between PEVs plugged into the plurality of EV charging stations and the MCUs in the plurality of EVSE units.

5. The EV charging system of claim 1, wherein the EV charging system further comprises a three-phase utility transformer, and the available supply current allocated or apportioned and reallocated or reapportioned among the plurality of EVSE units is derived from two phases of the three-phase utility transformer.

6. The EV charging system of claim 5, wherein each of the EVSE units is configured to support SAE J1772 AC Level 2 charging or AC charging defined by some other similar or competing EV charging standard.

7. The EV charging system of claim 1, wherein the EV charging system further comprises a three-phase utility transformer, the EVSE units are three-phase EVSE units, the solid-state switch in each of the three-phase EVSE units includes one or more solid-state switches disposed in each of three current-carrying conductors L1, L2, L3, and the available supply current allocated or apportioned and reallocated or reapportioned among the plurality of EVSE units is derived from three phases of the three-phase utility transformer.

8. The EV charging system of claim 7, wherein each of the EVSE units further comprises a rectifier that converts AC power to DC power, and the EVSE units are configured to support DC fast charging.

9. The EV charging system of claim 8, wherein the solid-state switches in the EVSE units are configured and controlled by their respective MCUs to perform power factor correction.

10. The EV charging system of claim 8, wherein the MCUs in the EVSE units are configured to regulate the DC voltages produced at outputs of the rectifiers.

11. The EV charging system of claim 7, wherein each EVSE unit further comprises an air-gap disconnect unit connected in series with the one or more solid-state switches disposed in three current-carrying conductors L1, L2, L3, between the input line-side terminals and the output load-side terminals of said each EVSE unit.

12. The EVSE charging system of claim 1, wherein the EVSE units are configured as busplugs and the EV charging system further comprises a busway with receptacles that the busplugs plug into.

13. The EVSE charging system of claim 12, wherein:
the EVSE charging system further comprises a three-phase utility transformer,
AC power from two phases of the three-phase utility transformer is distributed through the busway, and
the available supply current allocated or apportioned and reallocated or reapportioned among the plurality of EVSE units is derived from the AC power distributed through the busway.

14. The EVSE charging system of claim 12, wherein:
the EVSE charging system further comprises a three-phase utility transformer,
AC power from all three phases of the three-phase utility transformer is distributed through the busway, and
the available supply current allocated or apportioned and reallocated or reapportioned among the plurality of EVSE units is derived from the three-phase AC power distributed through the busway.

15. The EVSE charging system of claim 12, wherein:
the EV charging system further comprises a three-phase utility transformer and a high-power three-phase rectifier configured to convert three-phase AC power supplied at the output of the three-phase utility transformer to DC power,
the DC power is distributed through the busway, and
the available supply current allocated or apportioned and reallocated or reapportioned among the plurality of EVSE units is DC power derived from the DC power distributed through the busway.

16. The EVSE charging system of claim 12, wherein one or more of the EVSE units each further comprises a rectifier that converts AC power to DC power, and said one or more of the EVSE units are configured to support DC fast charging.

17. An electric vehicle supply equipment (EVSE) unit configured in an EV charging system, the EVSE unit, comprising:
input line-side terminals;
output load-side terminals;
a solid-state switch disposed between the input line-side terminals and output load-side terminals;
a controller,
wherein the controller and solid-state switch are configured to both control a maximum allowable charging current available to an associated EV charging station when a plug-in electric vehicle (PEV) is plugged into the EV charging station and provide circuit protection to the associated EV charging station and PEV; and
an air-gap disconnect unit having a closeable air gap connected in series with the solid-state switch, between the input line-side terminals and output load-side terminals, wherein the EVSE unit is configurable in three possible states and at any given time is configured in one of said three possible states:
an ON state during which the closeable air gap of the air gap disconnect unit is closed and the solid-state switch is ON;
a STANDBY state during which the closeable air gap of the air gap disconnect unit is closed and the solid-state switch is OFF; and
an OFF state during which the closeable air gap of the air gap disconnect unit is open and the solid-state switch is OFF.

18. The EVSE unit of claim 17, wherein the controller is configured to adjust one or more circuit protection attributes of the solid-state switch as the maximum allowable charging current is controlled and varied.

19. The EVSE unit of claim 17, wherein the controller is further configured to adjust one or more circuit protection attributes of the solid-state switch as PEVs plug into and unplug from the EV charging station.

20. The EVSE unit of claim 17, wherein:
the EVSE unit is configured in an electrical distribution panel, among other EVSE units,
the electrical distribution panel is configured to distribute a supply current to the EVSE unit and the other EVSE units,
the EVSE unit is communicatively coupled to the other EVSE units via an EVSE communications bus, and
the controller of the EVSE unit is configured to communicate and coordinate with controllers in the other EVSE units and allocate or apportion the supply current among the EVSE unit and the other EVSE units.

21. The EVSE unit of claim 17, wherein the EVSE unit is in the ON state when supplying charging current to the associated EV charging station but transitions briefly and temporarily from the ON state to the STANDBY state when dynamically adjusting a maximum allowable charging current available to the PEV from the EV charging station.

22. The EVSE unit of claim 17, further comprising a ground-fault circuit interrupter (GFCI) operable to detect ground faults both when the PEV is plugged into the EVSE unit's associated EV charging station and when no PEV is plugged into the EVSE unit's associated EV charging station.

23. An electric vehicle (EV) charging system including a plurality of electric vehicle supply equipment (EVSE) units, an EV charge control and circuit protection method, comprising: providing an air-gap disconnect unit having a closeable air gap connected in series with a solid-state switch, between input line-side terminals of each EVSE unit; configuring each EVSE unit in one of three possible states, wherein the possible states comprise; an ON state during which the closeable air gap of the air gap disconnect unit is closed and the solid-state switch is ON; a STANDBY state during which the closeable air gap of the air gap disconnect unit is closed and the solid-state switch is OFF; and an OFF state during which the closeable air gap of the air gap disconnect unit is open and the solid-state switch is OFF; allocating or apportioning a supply current among the plurality of EVSE units, each EVSE unit configured to limit, control and adjust a maximum allowable charging current available for supply to an associated EV charging station and plug-in electric vehicle (PEV); and reallocating or reapportioning the supply current among the EVSE units as other PEVs plug into other EV charging stations of the EV charging system to charge and as other PEVs complete charging and unplug from other EV charging stations of the EV charging system, wherein each EVSE unit is configured to provide circuit protection to its associated EV charging station and PEV by way of the airgap disconnect unit and the solid-state switch of the plurality of EVSE units, and one or more EVSE units of the plurality of EVSE units are configured to adjust their maximum allowable charging currents depending on how the supply currents is reallocated or reapportioned.

24. The method of claim 23, wherein said one or more EVSE units of the plurality of EVSE units are configured to adjust their one or more circuit protection attributes depending on to what extent their corresponding maximum allowable charging currents are adjusted.

25. The method of claim 23, further comprising:
setting circuit protection attributes provided by the EVSE units depending on how the supply current is allocated or apportioned among the plurality of EVSE units; and
adjusting one or more of the circuit protection attributes depending on how the supply current is reallocated or reapportioned among the EVSE units.

26. The method of claim 23, wherein each EVSE unit of the plurality of EVSE units comprises a solid-state switch through which an electrical current flows to an associated EV charging station and associated PEV and a controller that controls whether the electrical current is able to flow to said each EVSE unit's associated EV charging station and associated PEV.

27. The method of claim 26, further comprising:
setting circuit protection attributes of the solid-state switches of the plurality of EVSE units depending on how the supply current is allocated or apportioned among the plurality of EVSE units; and
adjusting one or more circuit protection attributes of one or more solid-state switches in one or more associated EVSE units of the plurality of EVSE units depending on how the supply current is reallocated or reapportioned among the plurality of EVSE units.

28. The method of claim 26, further comprising:
setting circuit protection attributes of the solid-state switches of the plurality of EVSE units depending on how the supply current is allocated or apportioned among the plurality of EVSE units; and
adjusting one or more circuit protection attributes of one or more of the solid-state switches in one or more associated EVSE units as PEVs plug into EV charging stations of the EV charging system to charge and as other PEVs complete charging and unplug from other EV charging stations of the EV charging system.

29. The method of claim 23, wherein reallocating or reapportioning the supply current among the EVSE units is performed according to a rules-based charge allocation algorithm.

30. The method of claim 29, wherein the rules-based charge allocation algorithm comprises a weighting-based charge allocation algorithm.

31. The method of claim 29, wherein the rules-based charge allocation algorithm includes a priority-based charge allocation algorithm.

* * * * *